United States Patent [19]
Sugahara et al.

[11] 3,935,298
[45] Jan. 27, 1976

[54] PROCESS FOR THE PREPARATION OF PHOSPHORIC ACID

[75] Inventors: Yujiro Sugahara, Tokyo; Yoshibumi Noshi, Tsuruoka; Hiroyuki Naito, Tsuruoka; Akira Takahashi, Tsuruoka; Shoji Shoji, Tsuruoka, all of Japan

[73] Assignee: Mizusawa Kagaku Kogyo Kabushiki Kaisha, Osaka, Japan

[22] Filed: July 2, 1973

[21] Appl. No.: 375,828

[30] Foreign Application Priority Data
Nov. 25, 1972 Japan............................ 47-118341

[52] U.S. Cl. ........................... 423/320; 423/167
[51] Int. Cl.² ........................................ C01B 25/16
[58] Field of Search ............ 423/167, 318, 319, 320

[56] References Cited
UNITED STATES PATENTS

| | | |
|---|---|---|
| 1,929,441 | 10/1933 | Milligan ............................ 423/321 |
| 2,384,813 | 9/1945 | Coleman ........................... 423/320 |
| 2,384,814 | 9/1945 | Coleman ........................... 423/320 |
| 2,504,544 | 4/1950 | Legal et al. ....................... 423/320 |
| 2,954,287 | 9/1960 | Carothers et al. ................ 423/167 |
| 3,003,852 | 10/1961 | Nordengren ...................... 423/167 |
| 3,161,467 | 12/1964 | Hignett et al. ................... 423/320 |
| 3,562,769 | 2/1971 | Sugahara et al. ................. 423/320 |
| 3,627,485 | 12/1971 | Hori et al. ........................ 423/167 |

*Primary Examiner*—Oscar R. Vertiz
*Assistant Examiner*—Eugene T. Wheelock
*Attorney, Agent, or Firm*—Sherman & Shalloway

[57] ABSTRACT

When phosphate rock and sulfuric acid are mixed under such conditions that gypsum dihydrate is stably formed and sulfuric acid is added to the phosphate rock in an amount not exceeding the amount equivalent to a calcium component in the phosphate rock, small masses of the reaction product between the phosphate rock and sulfuric acid can be maintained in the non-disintegrable form throughout extraction of phosphoric acid from said reaction product, and phosphoric acid can be extracted from such reaction product at a high rate in a good yield.

19 Claims, 2 Drawing Figures

PROCESS FOR THE PREPARATION OF PHOSPHORIC ACID

This invention relates to a novel process for the preparation of phosphoric acid by the granule extraction. More particularly, the invention relates to a novel process for the preparation of phosphoric acid in which the reaction product between phosphate rock and sulfuric acid can be maintained in the form of a nondisintegrable small mass throughout the extraction of phosphoric acid and phosphoric acid can be extracted from such reaction product at a high rate in a good yield.

A process comprising kneading under heat ground phosphate rock with 98 % sulfuric acid, molding the kneaded blend into granules, heating the granular mixture at 200° – 240°C. or 350° – 400°C. to remove fluorine therefrom, and extracting the mixture with water to obtain phosphoric acid of a relatively high concentration has been proposed as the process for the preparation of phosphoric acid by the granule extraction (so-called clinker process) (see specifications of U.S. Pat. No. 2,384,813 and U.S. Pat. No. 2,384,814).

However, when the granular mixture is heated at 200° – 240°C. in this conventional process, gypsum formed as the by-product is readily disintegrated in water during the extraction, and therefore, it is very difficult to separate phosphoric acid from gypsum formed as the by-product by filtration.

On the other hand, when the granular mixture is heated at 350° – 400°C., it is extremely difficult to extract the phosphoric acid component from the reaction mixture, and phosphoric acid is recovered only in a yield as low as 50 percent of less. Thus, industrialization of these processes are miscarried.

As the process for overcoming these defects of the conventional clinker processes, U.S. Pat. No. 3,562,769 proposes a process for the preparation of phosphoric acid comprising adding sulfuric acid and a disintegration-preventing agent selected from alkali metal salts and amorphous silica to calcium phosphate or phosphate rock, heating the mixture to convert it to dry, non-disintegrable small masses and extracting phosphoric acid from said small masses.

This process is characteristic over the conventional processes in that the small masses of the reaction product can be maintained in the non-disintegrable state throughout the extraction of the phosphoric acid component and the phosphoric acid component can be extracted from the reaction product in a relatively good yield. However, this process using disintegration-preventing agents is still insufficient in the following points. Particularly subsidiary starting substances such as alkali metal salts and amorphous silica must be employed. Further, when an alkali metal salt is used as disintegration-preventing agent, excessive sulfuric acid is consumed by the presence of such salt, resulting in increase of the manufacturing cost of phosphoric acid. On the other hand, when amorphous silica is used, there is a tendency that silica is extracted in the sol state into recovered phosphoric acid. Moreover, this process employing the above disintegration-preventing agent is also insufficient with respect to the reproducibility, because small masses of the reaction product are sometimes disintegrated at such low temperatures as enabling to facilitate the extraction of the phosphoric acid component, depending on the kind of starting phosphate rock or conditions of the reaction between phosphate rock and sulfuric acid.

We have made extensive research works on the clinker process for the preparation of phosphoric acid by mixing phosphate rock and sulfuric acid in the presence of water, drying the resulting mixture to obtain a solid reaction product and extracting phosphoric acid from this solid reaction product, and we have now found that the disintegrability of the solid reaction product between phosphate rock and sulfuric acid is greatly influenced by the form of gypsum formed at the time of mixing phosphate rock and sulfuric acid and by the amount of sulfuric acid to be used for this reaction; when the amount used of sulfuric acid is adjusted to a level not exceeding the amount equivalent to the calcium component in phosphate rock and the conditions adopted for mixing phosphate rock and sulfuric acid are so controlled that gypsum dihydrate is stably formed, small masses of the reaction product of phosphate rock and sulfuric acid can always be maintained in the non-disintegrable state while retaining the form of small masses throughout the extraction of the phosphoric acid component, irrespective of addition of a disintegration-preventing agent, namely even without addition of such specific agent; the treatment of converting the mixture of phosphate rock and sulfuric acid into a non-disintegrable solid reaction product can be conducted easily at such a low temperature as not exceeding 200°C. by adopting the above mixing conditions and extraction of the phosphoric acid from small masses of such reaction product can be accomplished at a high rate and in a good yield; and that small masses of the reaction product of phosphate rock and sulfuric acid obtained by the above process is excellent not only in the non-disintegrability when dipped in an extraction medium and allowed to stand still (hereinafter referred to as "static" non-disinterability) but also non-disintegrability under such conditions that particles of the reaction product come into frictional contact with one another (hereinafter referred to as "dynamic" non-disintegrability) and by dint of such characteristic properties of small masses of the reaction product it is made possible to conduct the extraction continuously on an industrial scale.

It is therefore a primary object of this invention to provide a process for the preparation of phosphoric acid in which the reaction product between phosphate rock and sulfuric acid can be maintained in the form of non-disintegrable small masses throughout the extraction of the phosphoric acid component with good reproducibility irrespective of addition of a specific disintegration-preventing agent.

Another object of this invention is to provide a process for the preparation of phosphoric acid in which a reaction product in the form of small masses which are not disintegrable in a medium for extraction of phosphoric acid can be prepared by treating the mixture of phosphate rock and sulfuric acid at a temperature lower than temperatures adopted in conventional clinker processes, namely at a temperature lower than 200°C., whereby it is made possible to recover phosphoric acid at a high manufacturing rate and in a high yield.

Still another object of this invention is to provide a process for the preparation of phosphoric acid in which small masses of the reaction product between phosphate rock and sulfuric acid can retain the form of non-disintegrable small masses in a medium for extraction of phosphoric acid even under such conditions that these small masses come into a frictional contact with one another and hence, the continuous extraction of the phosphoric acid component can be accomplished with ease on an industrial scale.

A still further object of this invention is to provide a process for the preparation of phosphoric acid in which the phosphoric acid component can be recovered from phosphate rock in a high yield even with use of a relatively small amount of sulfuric acid Other objects and advantages of this invention will be apparent from the description given hereinafter.

Figure 1:
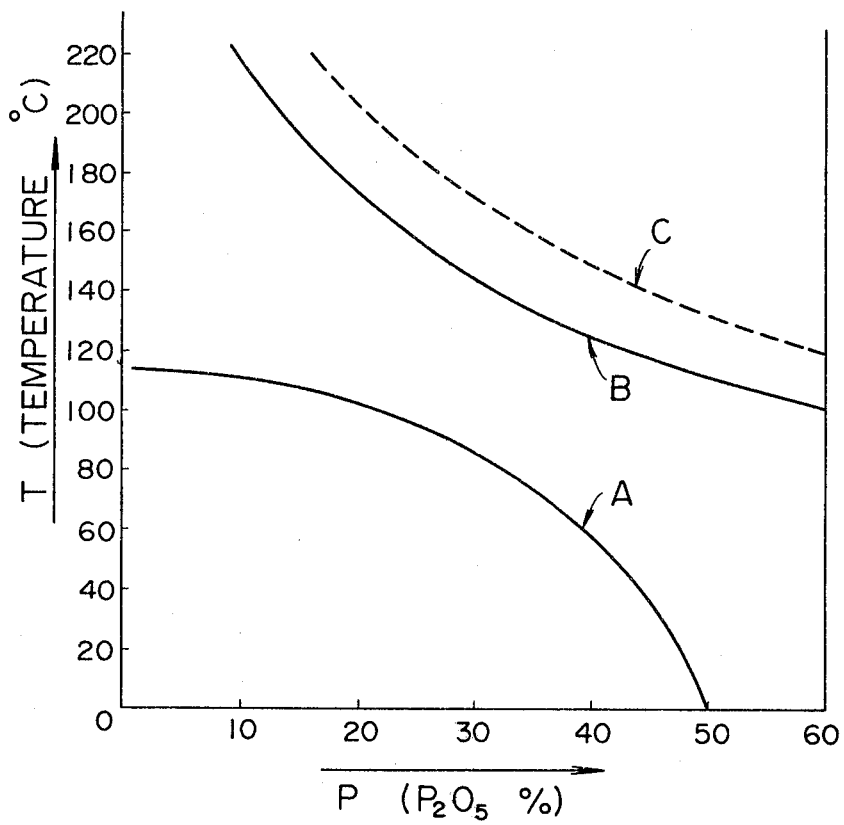
FIG. 1 shows the stability borders of the various types of $CaSO_4$ as a function of temperature and acid strength.

In accordance with this invention, there is provided a process for the preparation of phosphoric acid which comprises mixing phosphate rock and sulfuric acid in the presence of water, drying the mixture to obtain a solid reaction product between phosphate rock and sulfuric acid and extracting phosphoric acid from said solid reaction product, said process being characterized in that phosphate rock and sulfuric acid are mixed under such conditions that the gypsum dihydrate is stably formed and sulfuric acid is added to the phosphate rock in an amount not exceeding the amount equivalent to the calcium component in the phosphate rock.

The invention will now be detailed.

Mixing of Phosphate Rock and Sulfuric Acid

In this invention, phosphate rock is first mixed with sulfuric acid under the above-mentioned specific conditions.

Apatite, phosphorite, coprolite, nodule phosphate, guano phosphate and guano are preferably used in this invention as the phosphate rock, because they are readily available. The composition of such phosphate rock is usually as described below, though it varies to some extent depending on the place of production and the kind;

| | |
|---|---|
| $P_2O_5$ | 25 – 40 % |
| CaO | 44 – 52 % |
| $Al_2O_3$, $Fe_2O_3$ | 0.5 – 2.5 % |
| $SiO_2$ | 0.5 – 10.0 % |
| $Na_2O$, $K_2O$ | 0.3 – 1.8 % |
| F | 2 – 5 % |

It is preferable to use these rocks in the form of powder, so that they can be mixed uniformly with sulfuric acid. The particle size of the phosphate rock powder is not particularly critical in this invention, but in general, in order to attain a uniform contact between the phosphate rock powder and sulfuric acid, it is desired that the phosphate rock powder has a size less than 80 mesh, particularly less than 100 mesh, more particularly less than 150 mesh.

These phosphate rocks have the phosphoric acid component in the form of a calcium salt, and they are generally contain small amounts of impurities such as Fe, As, Cr, Mg, Mn, V, etc., though the contents and kinds of the impurities vary to some extent depending on the kind of the phosphate rock.

In the process of this invention, it is of course, possible to employ these rocks as they are, but preferably, these impurities, particularly the iron component, are removed in advance by such physical means as hydraulic or air elutriation, electrophoresis and magnatic separation.

When these rocks are ground to an average particle size of 150 $\mu$ or less, preferably 50 $\mu$ or less (passable through a 300 mesh-sieve), suspended in a liquid medium and agitated under the influence of magnetism, $\alpha$-type iron component contained in the rocks is selectively sedimented and a majority of the iron component in the rocks, e.g., 70–80 percent can be removed. Furthermore, in order to remove organic impurities contained in the starting rock, it is possible to fire in advance the starting rock powder at a temperature of, for instance, 400° to 700°C.

In this invention, it is also possible to mix an alkali metal halide such as sodium chloride with the starting phosphate rock in an amount of more than 0.2 percent by weight based on the phosphate rock and fire the mixture at a temperature of 300° to 1100°C., whereby a considerable amount of the iron component, e.g., even about 80 percent, can be removed.

Halides of alkaline earth metals, aluminum and zinc can be used as well as alkali metal halides for removal of the iron component.

Sulfuric acid can be added in the form of either an aqueous solution of sulfuric acid or anhydrous sulfuric acid such as fuming sulfuric acid, but in general, in order to attain homogeneous and intimate mixing between sulfuric acid and phosphate rock, it is preferable to use an aqueous solution of sulfuric acid containing water in an amount of 2 to 30 percent by weight. Of course, it is possible to use, instead of a pure aqueous solution of sulfuric acid or pure fuming sulfuric acid, a dilution of sulfuric acid with phosphoric acid which itself does not participate in the reaction, namely a mixture of phosphoric acid and sulfuric acid.

When such mixture of phosphoric acid and sulfuric acid is used as the sulfuric acid component, the phosphoric acid concentration can be increased in small masses of the reaction product and therefore, it is possible to obtain phosphoric acid of a high concentration at a high manufacturing rate. This feature is advantageous because a dilute phosphoric acid solution recovered from the step of the final acid washing of the solid reaction product, which will be detailed hereinafter, or a phosphoric acid waste liquor or a low concentration phosphoric acid solution obtained in other step can be utilized together with sulfuric acid and the phosphoric acid component contained in such liquor can be effectively fixed on the solid reaction product.

In this invention, in order to prevent the disintegration of the solid reaction product between phosphate rock and sulfuric acid, it is important to use sulfuric acid in an amount not exceeding the amount equivalent to the calcium component contained in the phosphate rock. As seen from the data shown in Table 12, appearing in Example 8 given hereinafter, when sulfuric acid is used in an amount greater than the amount equivalent to the calcium component contained in the phosphate rock, even if the phosphate rock and sulfuric acid are mixed under such conditions that gypsum dihydrate is formed, it is impossible to obtain a solid reaction product of phosphate rock and sulfuric acid which will be non-disintegrable throughout the operation of extraction of phosphoric acid. On the other hand, the lower limit of the amount used of sulfuric acid is not particularly critical in this invention and it is sufficient that sulfuric acid is added in such an amount as allowing sulfuric acid to react with the calcium component in the phosphate rock and thus release the phosphoric acid in the soluble form.

Accordingly, in this invention it is generally preferred that sulfuric acid is used in an amount of 0.7 to 0.97 equivalent, especially 0.8 to 0.95 equivalent, to the calcium component in the phosphate rock.

It is generally important that water is made present when sulfuric acid and phosphate rock are mixed. It is usually preferred that water is used in an amount of 43 to 122 parts by weight, especially 54 to 84 parts by weight, per 100 parts by weight (on the dry basis) of the phosphate rock.

In case the amount of water is less than the lower limit of the above range, uniform mixing and reaction of phosphate rock and sulfuric acid becomes difficult, because the viscosity of the mixture is too high. As a result, the recovery ratio of phosphoric acid (phosphate rock decomposition ratio) tends to decrease. Moreover, it becomes difficult to conduct the mixing of sulfuric acid and phosphate rock under such conditions that gypsum dihydrate is formed. When the amount of water is larger than the upper limit of the above-mentioned range, the problem of syneresis of the phosphoric acid component and water content is brought about and operational troubles are caused.

Water may be supplied in the form of an aqueous solution of sulfuric acid or a slurry of powdery phosphate rock. It is also possible to add water to the reaction mixture individually from phosphate rock or sulfuric acid.

One of the most important features of this invention is that phosphate rock and sulfuric acid are mixed under such conditions that gypsum dihydrate is stably formed.

It has been known that in the reaction product formed by mixing phosphate rock and sulfuric acid, the form of gypsum prepared as by-product varies depending on the temperature of the reaction mixture and the $P_2O_5$ concentration in the reaction mixture.

In this invention, the temperature ($t°C.$) of the mixture system and the $P_2O_5$ concentration ($P$) in the mixture system are so selected that gypsum dihydrate ($CaSO_4 \cdot 2H_2O$) is stably formed. More specifically, these two factors are so selected that they meet the following condition:

$$t = -0.111P + 0.00334P^2 - 0.000593\ P^3 + 107.2 \qquad (1)$$

This relation will now be explained by reference to the accompanying drawing. In FIG. 1, the ordinate indicates the temperature of the phosphate rock-sulfuric acid mixture system and the abscissa indicates the $P_2O_5$ concentration in the said mixture system. In FIG. 1, in the region above the dotted line curve C anhydrous gypsum ($CaSO_4$) is stably present, and in the region surrounded by curves C and B gypsum hemihydrate ($CaSO_4 \cdot \frac{1}{2}H_2O$) is stably present. In the region below the curve A gypsum dihydrate ($CaSO_4 \cdot 2H_2O$) is present stably. In contrast, in the region defined by curves A and B formation of gypsum is unstable, and gypsum dihydrate ($CaSO_4 \cdot 2H_2O$) and gypsum hemihydrate ($CaSO_4 \cdot \frac{1}{2}H_2O$) are formed in a random manner. In this invention, the region below the curve A is selected. In other words, the temperature and $P_2O_5$ concentration are so selected that the condition expressed by the above formula (1) will be satisfied.

In the conventional clinker process for the preparation of phosphoric acid, the temperatures adopted for drying and firing the phosphate rock-sulfuric acid reaction product are greatly concerned with the non-disintegrability of small masses of this reaction product, and it has been believed that elevation of the drying or firing temperature would improve the non-disintegrability of small masses. However, it has been found that when the drying or firing temperature is heightened, condensation of phosphoric acid is allowed to advance with elevation of the temperature and either the rate of extraction of the phosphoric acid component or the ratio of the extracted phosphoric acid component to the phosphoric acid component contained in the starting rock is lowered, with the consequence that it is difficult to improve the non-disintegrability and the extraction ratio simultaneously.

As the process which can satisfy the above two requirements simultaneously, namely the process capable of providing non-disintegrable small masses of the phosphate rock-sulfuric acid reaction product even when the drying or firing is carried out at a relatively low temperature, we previously proposed a process employing as a disintegration-preventing agent an alkali metal salt (U.S. Pat. No. 3,562,769) and a process employing as a disintegration-preventing agent hydrofluoric acid, hexafluorosilicic acid or a salt thereof.

In the conventional processes, since it was considered that the mixing of phosphate rock and sulfuric acid and the drying or firing of the mixture are included in the single reaction step, if water is present in a great amount in the phosphate rock-sulfuric acid mixture system, special energy and time are required for removal of such water. From such technical standpoint, in industrializing the above-mentioned, previously proposed processes, we tried to increase the slurry concentration of the phosphate rock-sulfuric acid mixture and utilize the reaction heat from such mixture for removal of water. To our surprise, however, it was confirmed in the series of such experiments for industrialization that when the slurry concentration is raised at the step of mixing of phosphate rock and sulfuric acid or when the temperature is elevated at this mixing step, the resulting small masses of the phosphate rock-sulfuric acid reaction product are disintegrated in an extraction medium or, even if they are not disintegrated under static conditions, they are easily disintegrated under industrial extraction conditions where small masses fall into a frictional contact with each other.

Therefore, we made detailed research works on the relation of the slurry concentration and temperature at the time of mixing phosphate rock and sulfuric acid to the non-disintegrability of the solid reaction product between phosphate rock and sulfuric acid, and as a result, we found that the factor giving the greatest influence to the non-disintegrability of small masses of the phosphate rock-sulfuric acid reaction product is neither the temperature for firing the reaction mixture nor the use of a disintegration-preventing agent, but the gypsum-forming condition at the time of mixing phosphate rock and sulfuric acid, and based on this finding we succeeded in obtaining small masses of the phosphate rock-sulfuric acid reaction product excellent in the non-disintegrability, especially in the dynamic non-disintegrability, by mixing phosphate rock and sulfuric acid under such conditions that gypsum dihydrate is stably formed.

Since the reaction between phosphate rock and sulfuric acid is an exothermic reaction, when phosphate rock is mixed with sulfuric acid, the temperature of the resulting mixture generally rises to 50° to 200°C. In this invention, the temperature of the mixture is so controlled as not to rise above beyond the curve A in FIG. 1. More specifically, the temperature is so controlled that the condition of the above formula (1) will be satisfied. For this purpose, it is preferable to adopt, for instance, such mixing conditions that the reaction heat generated by the mixing of phosphate rock and sulfuric acid is not accumulated in the reaction mixture or such means as positively cooling the resulting phosphate rock-sulfuric acid reaction mixture. Of course, in case decomposition of phosphate rock with sulfuric acid is insufficient, it is permissible to effect the heating within a range satisfying the condition of the above formula (1). In conducting the process of this invention, just after the mixing of phosphate rock and sulfuric acid the temperature of the mixture is frequently made higher than the temperature ($t°C$.) defined by the above formula (1) by the reaction heat generated from the mixture, but by maintaining the temperature within a range satisfying the condition of the above formula (1) after completion of the mixing, it is possible to from gypsum dihydrate stably in the reaction product mixture.

As described above, in this invention phosphate rock and sulfuric acid are mixed in the presence of water, and the amount of water is determined so that the $P_2O_5$ concentration in the resulting mixture will satisfy the condition of the above formula (1) in correspondence to the temperature ($t°C$.) of the mixture. Accordingly, the lower limit of the amount of water made present in the mixture is defined by the condition that gypsum dihydrate should be stably formed, and water is made present in an amount not less than the so defined lower limit. However, in case too large an amount of water is made present in the mixture, it takes a long time to convert the mixture to non-disintegrable small masses by drying. For this reasin, it is desired that the amount of water is so selected that the resulting mixture takes a form of a viscous slurry or exhibits a plastic appearance. This preferably range is generally expressed by the following formula:

$$0.70 \geq C \geq 0.45$$

wherein $C$ designates the concentration of the phosphate rock in the slurry (inclusive of water contained in sulfuric acid) obtained by incorporating water into phosphate rock, namely the value of the following formula:

$$C = \frac{\text{(weight of phosphate rock)}}{\text{(weight of phosphate rock)} + \text{(weight of total water)}}$$

The mixing of phosphate rock and sulfuric acid is carried out for a time sufficient to substantially complete the decomposition of the phosphate rock by sulfuric acid, namely for a time sufficient to substantially complete the formation of gypsum in the mixture.

The point of completion of this mixing can also be confirmed by termination of the heat generation from the mixture. Further, it can be confirmed by seeing termination of formation of a gas of the fluorine component from the mixture.

In the process of this invention, it is preferable to conduct the mixing of phosphate rock and sulfuric acid under the following conditions:

Temperature ($t°C$.): 30° – 105°C.
$P_2O_5$ concentration in phosphate rock slurry (P%): 20 – 45 percent
Combined condition of $t$ an P: $t \leq -0.111P + 0.00334P^2 - 0.000593P^3 + 107.2$
Phosphate rock concentration in slurry (C) : 0.45 – 0.70
Mixing time: 15 – 120 minutes, especially 30 – 60 minutes In the process of this invention, the mixing step can be conducted by employing a mixer of an optional type. Since the fluorine component contained in phosphate rock is converted to a gas at the time of mixing phosphate rock with sulfuric acid and the gas remains in the mixture in the form of bubbles, it is desired that the mixing is conducted so that cells inside the pasty or plastic mixture are perpetually exposed outside. For this purpose, a lateral or vertical mixing apparatus provided with one or a plurality of screws or agitation vanes is conveniently used. In order to maintain the temperature inside the mixing apparatus at a prescribed level, it is possible to pass a cooling medium through the inside of the screw or agitation vane or to blow cold air from such member.

Disintegration-Preventing Agent

As described above, in accordance with this invention, the mixing of phosphate rock and sulfuric acid is conducted under such conditions that gypsum dihydrate is stably formed, whereby it is possible to maintain the finally obtained small masses of the phosphate rock-sulfuric acid reaction product in the non-disintegrable state throughout the extraction of the phosphoric acid component. However, in order to further improve the non-disintegrability, especially the dynamic non-disintegrability, of dry small masses of the phosphate rock-sulfuric acid reaction product, a disintegration-preventing agent can be added, if desired, to the mixture system at the step of mixing phosphate rock and sulfuric acid.

As such disintegration-preventing agent, for instance, the following substances can be used:

1. hydrofluoric acid, hexafluorosilic acid or a salt thereof;
2. an alkali metal salt; and
3. amorphous silica.

As a salt of hydrofluoric acid or hexafluorosilicic acid, there may be employed alkali metal salts, e.g., sodium and potassium salts, and alkaline earth metal salts, e.g., calcium and magnesium salts. Use of the calcium salt is most preferred. In this embodiment, it is preferable to employ as the fluorine compound hydrofluoric acid or hexafluorosilic acid, The reason is that since such hydrofluoric acid or hexafluorosilicic acid is inevitably formed as a by-product at the reaction between phosphate rock and sulfuric acid, such by-product can be recycled and used. Of course, it is also possible to recover hydrofluoric acid or hexafluorosilic acid formed as a by-product in the form of a calcium salt and use it as a disintegration-preventing agent.

These fluorine compounds may be positively added to phosphate rock, or it is possible to utilize the fluorine component contained in phosphate rock and make it present in the mixture in the form of hydrofluoric acid, hexafluorosilicic acid or a salt thereof. For instance, when phosphate rock is sufficiently ground in water in advance by the wet method, the so treated phosphate rock is converted to small masses having a greatly improved dynamic non-disintegrability only by mixing the phosphate rock with sulfuric acid in an amount less than the amount equvalent to thecalcium component and heat-treating the mixture. Alternately, the reaction between phosphate rock and sulfuric acid is partially carried out by employing sulfuric acid in an amount of, for instance, 0.1 to 0.5 equivalent to the calcium component in phosphate rock and thus, the fluorine component contained in the phosphate rock is converted to hydrofluoric acid or hexafluorosilicic acid, whereby effects similar to thoses attained by treating phosphate rock in advance with hydrofluoric acid or hexafluorosilicic acid can be attained. In case a fluorine compound is added to pulverized phosphate rock, the fluorine compound is incorporated in a suitable form depending on the kind of the fluorine compound. For instance, the fluorine compound can be added in the form of a powder, a slurry or paste, an aqueous solution, a gas or a mist.

It is important that the mixing of phosphate rock with a fluorine compound is conducted in the presence of water. If the mixing is carried out in the absence of water, the intended effect, namely the enhanced improvement of the non-disintegrability, cannot be attained. In case the fluorine compound is added to pulverized phosphate rock, it is desired that the addition is effected in an optional stage prior to the step of mixing phosphate rock with sulfuric acid. Particularly good results are obtained when pulverized phosphate rock is mixed in advance with hydrofluoric acid, hexafluorosilicic acid or a salt is added to the resulting mixture.

In case the above mixing method is adopted, prior to the reaction between phosphate rock and sulfuric acid the surfaceof pulverized phosphate rock is uniformly treated with the fluorine compound, and hence, the resulting small masses of the phosphate rock-sulfuric acid reaction product are excellent in the non-disintegrability, especially in the dynamic non-disintegrability. If an aqueous solution of hydrofluoric acid or hexafluorosilicic acid is used in the above mixing method, the fluorine component formed as by-product at the reaction between phosphate rock and sulfuric acid can be recovered in the form of an aqueous solution, and it can be used repeatedly as it is or after concentration, which results in economical advantages.

It is preferred that this aqueous solution is sufficiently mixed with pulverized phosphate rock and the resulting slurry is subjected to the reaction with sulfuric acid.

In this embodiment, the amount of the fluorine compound to be used varies depending on the kind of the fluorine compound, but it is generally preferred that it is used in such an amount that the fluorine component is caught on the resulting small masses of the reaction product in an amount, as calculated as fluorine, of 3 to 10 percent by weight, especially 4 to 7 percent by weight.

The reason why the amount of the fluorine compound to be added is specified by the amount caught on the resulting reaction product in the present specification is as follows. In case hydrofluoric acid or hexafluorosilicic acid is used as the disintegration-preventing additive, a part of the acid escapes from the mixture system at the time of mixing. Therefore, it is reasonable to specify the amount of the fluorine compound by the amount of the additive effectively used, namely the amount of the fluorine compound additive fixed on the reaction product. Thus, when the fluorine compound additive is used in the form of a salt of hydrofluoric acid or hexafluorosilicic acid, it is sufficient that the salt is used in an amount, as calculated as fluorine, of 3 to 10 percent by weight based on the reaction product, and in case a free acid such as hydrofluoric acid or hexafluorosilicic acid is used, the acid is used in an amount equal to the above amount (3 to 10 percent by weight), or it is used in an amount a little greater than the above amount and a part of the added acid is fixed on the reaction product.

In this embodiment of this invention, when hydrofluoric acid or hexafluorosilicic acid is used as the fluorine compound additive, it is preferable to employ sulfuric acid and hydrofluoric acid or hexafluorosilicic acid in such amounts as meeting the following conditions:

$(F) = 0.03 - 0.3$, preferably $0.05 - 0.2$,
$(H_2SO_4) = 0.7 - 0.97$, preferably $0.8 - 0.95$, and
$(F) + (H_2SO_4) = 0.73 - 1$, preferably $0.8 - 0.98$ wherein $(F)$ designates the amount, expressed in terms of the equivalent number to calcium in phosphate rock, of hydrofluoric acid or hexafluorosilicic acid caught on the reaction product in the form of the salt, and $(H_2SO_4)$ stands for the amount of sulfuric acid expressed in terms of the equivalent number to calcium in phosphate rock.

As the alkali metal salt (2), we can mention chlorides, sulfates, oxides, phosphates, sulfides and silicates of lithium, sodium and potassium. In addition to these inorganic salts, alkali metal salts of carboxylic acids having 1 to 4 carbon atoms such as sodium acetate, sodium citrate and sodium oxalate can be used.

As the amorphous silica (3), hydrosol, hydrogel and xerogel of silica, and amorphous alumina-silica, amorphous calcia-silica and amorphous magnesia-silica can be used. This amorphous silica need not necessarily be pure but it may contain small quantities of impurities. For instance, intermediate or final products obtained from natural clay minerals can be used.

Such alkali metal salt and/or amorphous silica may be added to phosphate rock and/or sulfuric acid, either prior to, or simultaneously with, the mixing of phosphate rock and sulfuric acid. The amounts of these alkali metal salts and amorphous silica are not particularly critical, but in order to improve conspicuously the dynamic non-disintegrability, it is desired that they are added in such amounts as will satisfy the condition expressed by the following empirical formula:

$A(M_2O) + (SiO_2) - (CaF_2) \geq 5.2$ wherein $A$ is a number of from 5.8 to 7.2, especially 6.2, $(M_2O)$ is the weight percent of the alkali metal salt as oxide (the sum of the alkali metal component contained in the starting phosphate rock and the alkali metal salt added as the disintegration-preventing agent) based on the dry weight of the phosphate rock, $(SiO_2)$ is the weight percent of amorphous silica (the sum of amorphous silica contained in the starting phosphate rock and amorphous silica added as the disintegration-preventing agent) based on the dry weight of the phosphate rock, and $(CaF_2)$ is the weight percent of the fluorine component contained in the phosphate rock, reckoned as $CaF_2$.

Preparation of Phosphate Rock-Sulfuric Acid Reaction Product

In accordance with this invention, a mixture of phosphate rock and sulfuric acid containing gypsum dihydrate in the stable state and the phosphoric acid component in the extractable state is thus obtained. This mixture is dried to obtain a solid reaction product having a stabilized form. Various means can be adopted for conversion of this mixture to non-disintegrable dry small masses and suitable means are selected depending on the form and state of the mixture. Some of these means are described below.

1. For example, if the mixture of phosphate rock and sulfuric acid optionally with the disintegration-preventing agent has itself a considerably great form-retaining ability, this mixture is directly heated and, according to need, roughly ground to obtain dry small masses. Alternately, the mixture is first ground to small masses having a suitable size by means of a rough grinder or roll, followed by drying.

2. If the mixture is pasty or plastic, (a) it is extruded into a rod form by means of an extruder and cut into a suitable length if necessary, or (b) it is molded into a suitable form such as pellet, flake, dice, tablet or sphere by employing an appropriate molding apparatus. Then, the so molded mixture is dried.

3. If the mixture of phosphate rock and sulfuric acid is in the form of a slurry having a flowability, this slurry is sprayed in hot air, or it is poured on a rotary disc and scattered in hot air, whereby the slurry is molded into granules and dried simultaneously. Of course, the drying treatment is conducted after such granulation procedures, if the drying is insufficient.

4. Granulation and drying of the mixture of phosphate rock and sulfuric acid may be simultaneously accomplished, for example, be feeding the mixture into a fluidized bed. More specifically, the mixture is charged dropwise into a boilind bed, swelling bed or enforced circulation bed from the bottom of which hot is fed, and spherical particles of the phosphate rock-sulfuric acid reaction product having a certain size are withdrawn from the bed continuously or intermittently.

In this case, if the pulverized phosphate rock-sulfuric acid reaction product discharged outside together with the waste gas is recycled into the bed, the granulation of the mixture to small masses having a certain size can be promoted.

In order to increase the extraction rate (manufacturing rate) of the phosphoric acid component and the yield of phosphoric acid, it is important that the treatment temperature is adjusted to 200°C. or lower in drying the mixture of phosphate rock and sulfuric acid. In case the mixture is dried at a temperature exceeding 200°C., it is considered that excessive condensation of phosphoric acid will probably be advanced and for this reason, the extraction rate of the phorphoric acid component or the yield of phorphoric acid is drastically lowered. On the other hand, if the drying temperature is too low, stabilization of the form and state of the phosphate rock-sulfuric acid reaction product cannot be accomplished sufficiently.

In view of the foregoing, in this invention it is preferred that the mixture is dried at a temperature ranging from 100° to 200°C., especially from 120° to 180°C. The treating time necessary for obtaining non-disintegrable small masses of the phosphate rock-sulfuric acid rection product varies depending on the treatment conditions and the water content of the mixture but, in general, it is preferable to determine experimentally an appropriate treatment time within a range of from 15 to 180 minutes, especially from 30 to 90 minutes.

In this invention, when the phosphate rock-sulfuric acid mixture is subjected to the drying treatment, the form-retaining ability of the mixture is enhanced, and the reaction between phosphate rock and sulfuric acid is completed, simultaneously with advance of escape of the gaseous fluorine component. Further, during this drying treatment, gypsum dihydrate in the mixture is in many cases converted to $\beta$-type anhydrous gypsum, or it is sometimes converted to a mixture composed mainly of $\beta$-type anhydrous gypsum and containing a minor amount of $\gamma$-type anhydrous gypsum or gypsum hemihydrate.

In this invention, however, in order to maintain small masses of the phosphate rock-sulfuric acid reaction product in the non-disintegrable state, even if the gypsum is finally coverted to anhydrous gypsum in said small masses, it is indispensable that is should pass through the state of gypsum dihydrate, which will readily be understood from the results of Example 6 illustrated in Table 9 given hereinafter.

It is preferred that small masses of the solid reaction product obtained from this step of this invention has a particle size of 0.1 to 50 mm, especially 0.5 to 20 mm. In such case, the extraction of phosphoric acid and the solid-liquid separation between extracted phosphoric acid and residual gypsum can be accomplished very conveniently. It is considered that in the so obtained small masses of the solid reaction product phosphoric acid is uniformly distributed in the matrix of gypsum (anhydrous gypsum). This is apparent from the fact that under electron microscope observation it is confirmed that a great number of fine pores are present in shells left after extraction of the phosphoric acid from small masses of said reaction product.

Extraction of Phosphoric Acid Component

The phosphoric acid component can be extracted from small masses of the reaction product between phosphate rock and sulfuric acid by means of known solid-liquid extraction operations.

Such extraction procedures are detailedly described in U.S. Patent No. 3,562,769.

Any of known extraction media such as water, aqueous acid media, water-miscible organic solvents, especially alcohols having less than 6 carbon atoms, e.g., n-butanol (see, for example, Ind. Eng. Chem., 53, page 31 (1961) ), etc. can be used as the extraction medium. In this invention use of water and an aqueous solution of phosphoric acid is generally preferred. Further, it is possible to obtain a highly concentrated aqueous solution of phosphoric acid with a high recovery ratio by contacting the small masses of the phosphate rock-sulfuric acid reaction product first with a concentrated aqueous solution of phosphoric acid, contacting them with aqueous solutions of phosphoric acid of successively lowered concentrations, and finally contacting them with water Of course, it is possible to employ an aqueous solution of an acid other than phosphoric acid. In this case, phosphoric acid is recovered in the form of an aqueous solution of a mixture of phosphoric acid with the acid used for the extraction.

The extraction can be conducted continuously or batchwise. It is also possible to conduct the extraction in the multi-staged manner by employing a series of unit extraction apparatuses of the batch type. Any of known extraction apparatuses can be used in this invention. For instance, mixer-settlers, solid-liquid extraction apparatuses of the fixed or moving bed type provided with a packed layer, continuous extraction apparatuses of the horizontal or inclined rotation type, filter press type dialyzers and other various extraction apparatuses can be used in this invention. The extraction of the phosphoric acid component from small masses of the reaction product can be accomplished especially effectively by employing an apparatus comprising an inclined cylinder having in the inside thereof a continuous partition wall of a spiral form, feeding an extraction medium from the upstream side of the apparatus and feeding the small masses of the phosphate rock-sulfuric acid reaction product from the downstream side of the appratus, and thus contacting the small masses with the extraction medium.

Extraction conditions vary considerably depending on the kind of the extraction medium used and the manner of extraction. In general, it is preferred in this invention that the small masses of the reaction product are contacted with an extraction medium at a temperature of 5° to 100°C., especially 70° to 95°C.

In this invention, small masses obtained by mixing phosphate rock and sulfuric acid under such conditions that gypsum dihydrate is stably formed are not only excellent in both the static non-disintegrability and the dynamic non-disintegrability, but also distinguishable in the reproducibility of such non-disintegrability. Accordingly, phosphoric acid can be extracted on an industrial scale at high efficiency in accordance with this invention.

Processes comprising preparing small masses composed of a reaction product between phosphate rock and sulfuric acid, namely so-called clinkers, and extracting the phosphoric acid component from the so formed clinkers have been known in the art from the specifications of U.S. Pat. Nos. 2,384,813, 2,384,814, 2,504,544, 3,161,467 and 3,562,769. However, none of these clinker processes were successfully industrialized. Some of direct reasons for failure in industrialization of these processes are as follows. Such clinkers are readily disintegrated in a phosphoric acid extraction medium, for instance, water, or if they are not disintegrated, when allowed to stand under stationary conditions, they are easily disintegrated under such conditions that they haave a frictional contact with one another, with the result that they are converted to a mud-like product whose handling is very difficult. Further, clinkers formed by the conventional processes are much inferior in the reproducibility of the non-disintegrability, and if improvement of the reproducibility is intended, the firing or drying temperature should be extremely heightened. Therefore, the rate of extraction of the phosphoric acid component from such clinkers, namely the manufacturing rate of phosphoric acid is drastically lowered.

In clinkers formed by the conventional clinker processes, the non-disintegrability is greatly influenced by the temperature at which the clinkers are fired or calcined, and it is believed that the non-disintegrability of the clinkers in the extraction medium can be improved by elevating the firing temperature. However, at such high temperatures the phosphoric acid component is excessively polymerized and the extraction rate of phosphoric acid is frequently lowered. In other words, in the conventional clinkers the polymerized phosphoric acid component is utilized as a binder for the clinker, and therefore, it is extremely difficult to attain simultaneously the improvement of the non-disintegrability of clinkers in the extraction medium and the improvement of the extraction rate of phosphoric acid.

In this invention, however, contrary to such conventional concepts, the temperature and $P_2O_5$ concentration are maintained at rather low levels at the time of mixing phosphate rock and sulfuric acid, and such conditions are selected that gypsum dihydrate is stably formed, whereby both the improvement of the non-disintegrability of clinkers and the increase of the reproducibility of the non-disintegrability can be attained simultaneously with conspicuous acceleration of extraction of the phosphoric acid component from the clinkers.

Since the non-disintegrable phosphate rock-sulfuric acid reaction product to be used in this invention is a product obtained by conducting the heat treatment at a relatively low temperature such as 200°C or below, in the phosphoric acid extraction the manufacturing rate of phosphoric acid is much higher than in the conventional clinker processes. More specifically, in accordance with this invention, the extraction of the phosphoric acid component is generally completed in a relatively short time, for instance, 30 minutes to 10 hours, especially 1 to 5 hours. In contrast, according to the conventional clinker processes, as described in Example 1 of the specification of U.S. Pat. No. 3,562,769, such a long time as 24 hours is generally required for extraction. Thus, it will readily be understood that the process of this invention can attain a very high manufacturing rate of phosphoric acid.

In this invention, the small masses of the reaction product are not disintegrated throughout the extraction operation even under severe extraction conditions, but maintain the original form of small masses. Therefore, the extraction of the phosphoric acid component and the separation of the extract from gypsum formed as by-product can be performed without such troubles as clogging of a filter, even when only a small amount of the extraction medium is employed.

The residual shells left after the extraction of the phosphoric acid component are composed of anhydrous gypsum, and they can be converted to gypsum dihydrate by conducting recrystallization from water or an aqueous solution of sulfuric acid. Phosphoric acid obtained in the process of this invention is generally more highly concentrated than phosphoric acid products obtained in the conventional clinker processes, and it is also excellent over the conventional products with respect to the purity, because amounts of sulfuric acid, alkali metals and silica incorporated in the phosphoric acid product are extremely small.

Further, in accordance with this invention, small masses of the sulfuric acid-phosphate rock reaction product are converted to non-disintegrable small masses by the heat treatment conducted at such alow temperature as not exceeding 200°C. Accordingly, another advantage that the extraction of phosphoric acid can be accomplished at a very high manufacturing rate is attained in this invention.

This invention will now be illustrated more detailedly by reference to Examples.

EXAMPLE 1

This Example illustrates a process comprising intimately mixing pulverized phosphate rock produced in Florida with hexafluorosilicia acid ($H_2SiF_6$), mixing and reacting sulfuric acid with the resulting mixture under conditions satisfying the following requirement $$t \leq -0.111P + 0.00334P^2 - 0.000593P^3 + 107.2$$

heat-treating the mixture to shape it into non-disintegrable small masses and extracting and recovering phosphoric acid from these small masses.

Phosphate rock produced in Florida is selected as the starting phosphate rock, and it is sufficiently pulverized to a size passable through a 200-mesh sieve. The composition (main components) of this pulverized phosphate rock produced in Florida is analyzed to obtain results shown in Table 1. 8n.

Table 1

| Components | Weight Percent |
|---|---|
| water | 2.34 |
| $P_2O_5$ | 31.22 |
| CaO | 45.13 |
| MgO | 0.31 |
| $Fe_2O_3$ | 1.42 |
| $Al_2O_3$ | 0.88 |
| $SiO_2$ | 8.96 |
| F | 3.70 |

The hexafluorosilicic acid mixed into the pulverized phosphate rock is employed in the form of an aqueous solution having a concentration of 190 g per liter as caluculated as $H_2SiF_6$.

To 100 Kg of the pulverized phosphate rock is added 63 liters of the aqueous solution of hexafluorosilicic acid. Namely, hexafluorosilicic acid is added in an amount corresponding to about 0.1 equivalent to the calcium component (CaO) contained in the phosphate rock. In the instant specification, by the term "equivalent" is meant the chemical equivalent. Thus, if the mole ratio of CaO : $H_2SiF_6$ is 3 : 1, the amount of $H_2SiF_6$ is one equivalent to CaO. The mixture is well blended under agitation in a mixing tank equipped with agitation vanes for about 30 minutes. At this time, bubbling occurs in the mixture slurry and generation of a stimulant smell is observed. And, it is also confirmed that the temperature rises to about 60° to about 80°C.

Then, 94% sulfuric acid ($H_2SO_4$) is added to the mixed slurry in the mixing tank and mixed therewith. The amount of sulfuric acid added is 0.9 equivalent to the calcium component (CaO) contained in the starting phosphate rock; namely about 76 Kg of 94% sulfuric acid ($H_2SO_4$) is added. In this case, the mixing reaction of the slurry composed of the pulverized phosphate rock and the aqueous solution of hexafluorosilicic acid with 94% sulfuric acid is accomplished by pouring both the reactants into a mixing reaction tank equipped with agitation vanes simultaneously. At this reaction, the temperature of the resulting mixture is so adjusted to satisfy the following conditions:

$$t \leq -0.111P + 0.00334P^2 - 0.000593P^3 + 107.2$$

Namely, the temperature of the mixture is maintained at a level not exceeding 85°C. After pouring of both the reactants, sufficient mixing is carried out under agitation for about 30 minutes.

Just after pouring of 94% sulfuric acid and the mixed slurry of the pulverized phosphate rock and the aqueous solution of hexafluorosilic acid, generation of a gas composed mainly of fluorine compounds is observed for a while, and at the same time, bubbles such as seen in pancake are formed in the mixture. But, when the agitation is continued, a pasty reaction product having a flowability is obtained.

The so formed pasty reaction product having a flowability is cast in the form of a ribbon having a width of about 10 mm on a Teflon-treated steel plate, and it is dried and dehydrated in an atmosphere maintained at about 120°C. to obtain a hard dry reaction product in the form of flaky small masses having a size of 3 to 10 mm. Generation of a gas composed mainly of fluorine compounds is also observed during this drying and molding step.

The resulting flaky small masses are heat-treated for about 1 hour in a drying device maintained at 160°C. to obtain further hardened dry small masses. Also during this heat treatment, generation of a gas composed mainly of flourine compounds continues.

These gases composed mainly of fluorine compounds, which are generated during the mixing reaction step, the drying and molding step and the heat treating step, are recovered in water, and the resulting aqueous solution is recyled and utilized as a disintegration-preventing additive in the form of an aqueous solution of hexafluorosilicic acid.

The static disintegration ratio and dynamic disintegration ratio of the resulting small masses are determined to obtain results shown in Table 2 given hereinbelow. Further, the decomposition ratio of the phosphoric acid component in the pasty reaction product prior to the dehydration and drying, and the composition of the main components of the heat-treated small masses are determined. Results are also shown in Table 2. Furthermore, the main components of the pasty reaction product and of shells of the heat-treated small masses are analyzed according to the X-ray diffraction analysis to obtain results shown in Table 2.

The values of the static disintegration ratio and dynamic disintegration ratio are measured by the following methods.

Static Disintegration Ratio

Heat treated small masses (having a size greater than 3 mm) are wrapped in a Saran net (having a diameter of 2 mm) and thrown into water. The amount (weight) of small masses left in the net is measured and the value of the static disintegration ratio is calculated from the following formula:

$$\frac{W_1 - W_p - W_2}{W_1 - W_p} \times 100 = Ds(\%)$$

wherein $W_1$ is the dry weight of the small masses of the phosphate rock-sulfuric acid reaction product; $W_2$ is the dry weight of the small masses left on the Saran net; $W_p$ is weight as caluculated as $P_2O_5$, of phosphoric acid eluted in water; and $Ds$ indicates the static disintegration ratio.

Dynamic Disintegration Ratio

Small masses of the phosphate rock-sulfuric acid reaction product and water are charged at a weight ratio of 1 : 2 into a cylindrical vessel, and the cylindrical vessel is rotated for 1 hour at a rate of 5 rpm. Then, the solid-liquid separation is carried out with use of a Saran net having a diameter of 2 mm, and the weight of the small masses left on the Saran net is measured. The value of the dynamic disintegration ratio is calculated from the following formula:

$$\frac{W_1 - W_p - W_3}{W_1 - W_p} \times 100 = Dd\ (\%)$$

wherein $W_1$ and $W_p$ are as defined above with respect to the static disintegration ratio; $W_3$ is the dry weight of the small masses left on the Saran net after one hour's rotation; and $Dd$ is the dynamic disintegration ratio.

The decomposition ratio of the phosphoric acid component in the pasty reaction product prior to drying is determined by the following method:

One part by volume of the pasty reaction product is suspended into 5 to 10 aprts by volume of hot water, and after 5 minutes have passed, the filtration is carried out, and the residue is washed repeatedly with hot water of a volume 30 – 35 times the volume of the residue, until the presence of the phosphoric acid component becomes undetected in the washing liquor. The composition of the washing residue is analyzed, and the decomposition ratio is calculated from the analysis values of CaO and $P_2O_5$.

Table 2

| Main Composition | Washing Residue of Pasty Rection Product (wt. %) | Heat-Treated Small Masses (wt. %) |
|---|---|---|
| Static Disintegration Ratio (Ds) | 0 % | |
| Dynamic Disintegration Ratio (Dd) | 4 % | |
| CaO | 35.62 | 26.80 |
| $P_2O_5$ | 0.48 | 18.44 |
| F | 5.90 | 7.55 |
| $SO_3$ | 44.25 | 33.01 |
| X-Ray Diffraction Analysis | $CaSO_4.2H_2O$ | $\beta$-$CaSO_4$(partially $CaSO_4.\frac{1}{2}H_2O$) |
| Decomposition Ratio (%) | 98.1 | |

From the above results, it is seen that the heat-treated small masses exhibits not only good static non-disintegrability but also good dynamic non-disintegrability.

By untilizing such characteristic non-disintegrability of the heat-treated small masses, the phosphoric acid component in the small masses is separated and recovered from $\beta$-$CaSO_4$ which is the main component constituting shells of the small masses with use of a rotary drum extraction apparatus of the counter-current type.

The extraction apparatus employed comprises a rotary drum having a length of 5.2 m and a diameter of 0.5 m, on the inner wall of which ribbons having a height of 11.5 cm are spirally disposed at intervals of 10 cm. The small masses are continuously fed from one opening of the rotary drum and an extraction medium is continuously poured from the other opening, whereby both are contacted with each other in the rotary drum in a counter-current manner, while recovering extracted crude phosphoric acid from the opening for introduction of the small masses and discharging continuously from the other opening the small masses composed mainly of calcium sulfate which correspond to the residue from which the phosphoric acid component has been separated. The rotation number of the rotary drum of this extraction apparatus is so adjusted that the solid small masses have a contact with the extraction medium in the drum for a period of about 1 hour and the amount of the extraction medium introduced is controlled depending on the amount of the small masses fed so that the solid:liquid ratio is maintained at 3 : 2 in the drum.

The composition of the main components of the recovered crude phosphoric acid, the extraction raito based on the decomposed $P_2O_5$ in the heat-treated small masses, and the composition of the main components of the extraction residue obtained when the discharged small masses composed mainly of calcium sulfate are dried are shown in Table 3.

Table 3

| Crude Phosphoric Acid | |
|---|---|
| $P_2O_5$ | 46.78 % by weight |
| CaO | 0.33 % by weight |
| $SO_3$ | 0.46 % by weight |
| F | 0.71 % by weight |
| $Al_2O_3$ | 0.88 % by weight |
| $Fe_2O_3$ | 1.70 % by weight |
| Specific gravity | 1.583 |
| Extraction ratio | 98.8 % |
| Extraction Residue | |
| CaO | 38.00 % by weight |
| $SO_3$ | 44.32 % by weight |
| $P_2O_5$ | 0.52 % by weight |
| F | 6.03 % by weight |
| Decomposition ratio | 98.1 % |

From the above results, it can readily be understood that small masses obtained by adding the fluorine component recovered from the small mass-forming step to the system of the reaction between the phosphate rock slurry and sulfuric acid and adjusting the conditions of said reaction so that the following requirement is satisfied $$t \leq -0.111P + 0.00334P^2 - 0.000593P^3 + 107.2$$

do not disintegrate throughout the step of extracting phosphoric acid therefrom; therefore, the extraction can be conducted continuously without employing a special filter; the amount of the phosphoric acid component left unextracted in the extraction residue is extremely small; and that crude phosphoric acid can be recovered at such a high recovery ratio as about 97 percent based on the phosphoric acid component contained in the starting phosphate rock.

The gypsum recovered as the extraction residue is purified into gypsum dihydrate according to the customary recrystallization method, and at the same time, the filuorine component contained in the residue can be recovered.

EXAMPLE 2

This Example illustrates a process comprising mixing and reacting sulfuric acid with pulverized phosphate rock without addition of a particular disintegration-preventing agent under such conditions that the following requirement is satisfied:

$$t \leq -0.111P + 0.00334P^2 - 0.000593P^3 + 107.2$$

heat-treating the reaction mixture to obtain non-disintegrable small masses, and extracting and recovering phosphoric acid from said small masses.

The same pulverized phosphate rock produced in Florida as employed in Example 1 is chosen as the starting phsphate rock.

To 2 Kg of this pulverized phosphate rock is added 1250 ml of water, and the mixture is sufficiently blended for about 10 minutes under agitation in a mixing tank equipped with agitation vanes. Then, the resulting slurry is incorporated with 94 % sulfuric acid ($H_2SO_4$) in an amount corresponding to 0.95 equivalent to the calcium component (CaO) contained in the slurry, namely in an amount of about 1.6 Kg, to effect the mixing reaction therebetween. The mixing reaction is accomplished by pouring simultaneously both the reactants into a mxing reaction tank equipped with agitation vanes. At this mixing reaction, the temperature of the reaction mixture is so adjusted that the following condition is satisfied:

$t \leq -0.111P + 0.00334P^2 - 0.000593P^3 + 1.072$

Namely, the temperature of the reaction mixture is maintained at a level not exceeding 85°C. After pouring of the reactants, the mixture is sufficiently agitated for about 30 minutes.

For a certain period from the pouring of the phosphate rock slurry and sulfuric acid, the generation of heat and a gas composed mainly of fluorine compounds is observed, and simultaneously, bubbles such as seen in pancake are formed from the reaction mixture, but a pasty reaction product having a flowability is obtained when the agitation is continued.

In the same manner as described in Example 1, the reaction mixture is dried, molded and heat-treated to obtain heat-treated, hard, non-disintegrable small masses.

The phosphoric acid is extracted from the so obtained non-disintegrable small masses according to the granule extraction method described in Example 1-B of our U.S. Pat. No. 3,562,769. Namely, the heat-treated non-disintegrable small masses are thrown into an extraction column charged with 250 ml of an aqueous extraction medium and the extraction of the phosphoric acid component is accomplished by utilizing the characteristic properties of the small masses. A columnar glass tube having a diameter of 7 cm and a length of 30 cm is employed as the extraction column, and a perforated plate is disposed in the lower portion of the tube to receive the small masses thereon. An outlet for the extraction liquid is disposed below the perfolated plate so that the extraction liquor of an amount equal to the amount of the extraction medium poured from the column head is withdrawn from the outlet by means of syphonage.

More specifically, in this extraction column, the heat-treated non-disintegrable small masses are heated at 85°–90°C. in the state immersed in a primary extraction medium (water) and allowed to stand still for about 150 minutes, during which the phosphoric acid component is eluted in the solvent from the small masses. Immediately, hot water heated at 90°C. as the displacing extraction medium is added dropwise from the upper portion of the column at a rate of 100 ml per hour. Thus, a crude phosphoric acid solution is withdrawn from the column bottom by means of syphonage in an amount corresponding to the amount added of the displacing solvent, and finally, 250 ml of highly concentrated crude phosphoric acid is recovered. At this extraction step, since there is a great difference of the specific gravity between the extraction liquor and the extraction medium, i.e., hot water, the interface between the phosphoric acid extract and water is hardly disturbed and concentrated phosphoric acid can be recovered. Subsequently, the extraction is repeated by employing hot water as an extraction medium in the same manner as described above, to thereby obtain dilute crude phosphoric acid, which can be used as the above-mentioned primary extraction medium.

Then, in the extraction column the residual reaction product is washed with use of water in the same manner as described, and the amounts of CaO and $P_2O_5$ in the residual gypsum are determined. Based on results of the determination, the decomposition ratio based on $P_2O_5$ contained in the starting phosphate rock is calculated.

Results of the analysis of the composition of concentrations of the recovered liquids, the phosphoric acid extraction ratio, the ratio of decomposition in the washing residue of pastry reaction product determined in the same manner as in Example 1 and the decomposition ratio obtained by the qualitative analysis of the residual gypsum are shown in Table 4.

Table 4

| [Analysis of Composition of Pasty Reaction Product] | |
|---|---|
| CaO | 17.05 % by weight |
| $P_2O_5$ | 11.72 % by weight |
| $SO_3$ | 26.08 % by weight |
| Water | 40.00 % by weight |
| X-ray diffraction analysis: | $CaSO_4.2H_2O$ |
| Theoretical upper limit of reaction temperature: | 85.3°C. |
| Actual paste temperature at reaction: | 75 – 83.0°C. |
| [Washing Residue of Pasty Reaction Product] | |
| CaO | 34.14 % by weight |
| $P_2O_5$ | 0.553 % by weight |
| $SO_3$ | 52.12 % by weight |
| Decomposition ratio | 97.66 % |
| [Analysis of Composition of Heat-Treated Small Masses] | |
| CaO | 28.01 % by weight |
| $P_2O_5$ | 19.78 % by weight |
| $SO_3$ | 38.03 % by weight |
| X-ray diffraction analysis: | $\beta$-$CaSO_4$ (plus $CaSO_4.\frac{1}{2}H_2O$) |
| Static disintegration ratio: | 0 |
| Dynamic disntegration ratio: | 11 |
| [Analysis of Compositions of Recovered Crude Phosphoric Acid] | | |
| | Concentrated Phosphoric Acid | Dilute Phosphoric Acid |
| $P_2O_5$ | 25.63 (g/100 ml) | 4.20 (g/100 ml) |
| CaO | 0.32 (g/100 ml) | 0.04 (g/100 ml) |
| $SO_3$ | 0.45 (g/100 ml) | 0.08 (g/100 ml) |
| Specific gravity | 1.350 | 1.080 |
| Extraction ratio | 98.5 % | |
| [Analysis of Composition of Residual Small Masses] | | |
| CaO | 35.90 % by weight | |
| $SO_3$ | 54.81 % by weight | |
| $P_2O_5$ | 0.939 % by weight | |
| Decomposition ratio | 96.2 % | |

From the above results, it will readily be understood that even if a particular disintegration-preventing agent is not present, when the reaction between phosphate rock and sulfuric acid is conducted under such conditions that the following requirement is satisfied.

$t \leq -0.111P + 0.00334P^2 - 0.000593P^3 + 107.2$ the resulting small masses do not disintegrate throughout the extraction step and phsophric acid can be recovered in a very high yield.

EXAMPLE 3

This Example illustrates a process for preparing phosphoric acid in which phosphate rocks produced in various locales are used and they are mixed and reacted with sulfuric acid without addition of a particular disintegration-preventing agent under such conditions as will satisfy the following requirement:

$$t \leq -0.111P + 0.00334P^2 - 0.000593P^3 + 107.2$$

Seven phosphate rocks produced in North Carolina, Taiba, Cetulla, Makatea, Morocco, Kola and Florida are chosen as the starting phosphate rock. The compositions (wt. %) of main components of these phosphate rocks are as shown in Table 5.

Table 5

| Locale | $P_2O_5$ | CaO | $R_2O_3$*) | $M_2O$**) | $SiO_2$ | F |
|---|---|---|---|---|---|---|
| North Carolina | 32.60 | 52.56 | 1.33 | 1.28 | 2.97 | 3.59 |
| Taiba | 37.05 | 51.41 | 2.44 | 0.78 | 3.00 | 4.24 |
| Cetulla | 31.24 | 47.03 | 2.66 | 1.09 | 9.43 | 3.29 |
| Makatea | 37.14 | 53.43 | 1.48 | 0.54 | 2.20 | 5.12 |
| Morocco | 36.62 | 52.89 | 0.68 | 1.30 | 3.26 | 4.29 |
| Kola | 38.86 | 51.39 | 1.23 | 0.29 | 1.02 | 3.36 |
| Florida | 31.22 | 45.13 | 2.30 | 0.63 | 8.96 | 3.70 |

*): $R_2O_3$ is the sum of $Al_2O_3$ and $Fe_2O_3$.
**): $M_2O$ is the sum of $K_2O$ and $Na_2O$.

Each of these 7 phosphate rocks are sufficiently ground to have a size passable through a 200-mesh sieve. To 2 Kg of the so pulverized phosphate rock is added 1450 ml of water, and they are mixed sufficiently under agitation for about 30 minutes in a mixing tank equipped with agitation vanes. Then 94 % sulfuric acid is added to the mixture in an amount corresponding to 0.9 % equivalent to the calcium component (CaO) contained in the starting phosphate rock, namely in an amount indicated in Table 6 given below, to effect the mixing reaction between them. The mixing reaction is conducted by simultaneously pouring both the reactants in a mixing reaction tank equipped with agitation vanes, and the reaction conditions are so controlled that the following requirement is satisfied:

$$t \leq -0.111P + 0.0034P^2 - 0.000593P^3 + 107.2$$

Namely, the reaction temperature is maintained at a level not exceeding the calculated temperature upper limit shown in Table 6. After the pouring of both the reactants, the mixture is sufficiently agitated for about 60 minutes.

In the same manner as described in Example 1, the resulting reaction mixture is dried, molded and heat-treated to obtain non-disintegrable small masses. According to the same granule extraction method as described in Example 2, the phosphoric acid component is extracted from the small masses with use of hot water, and the decomposition ratio and extraction ratio are determined in the same manner as described in Example 2.

Results are shown in Table 6.

Table 6

| Locale | North Carolina | Taiba | Cetulla | Makatea | Morocco | Kola | Florida |
|---|---|---|---|---|---|---|---|
| Amount of 94% $H_2SO_4$ | 1.76 | 1.92 | 1.57 | 1.79 | 1.77 | 1.72 | 1.51 |
| Value of P in formula | 30.81 | 27.05 | 23.78 | 27.05 | 26.77 | 27.95 | 23.78 |
| Calculated temperature upper oimit (°C) | 89.6 | 94.9 | 98.5 | 94.9 | 95.2 | 93.8 | 98.5 |
| Paste temperature at reaction (°C) | 78–86 | 80–90 | 80–90 | 80–90 | 83–94 | 82–92 | 85–95 |
| Static disintegration ratio (Ds) | 4 | 0 | 0 | 0 | 9 | 13 | 0 |
| Dynamic disintegration ratio (Dd) | 15 | 6 | 4 | 4 | 13 | 20 | 7 |

(Recovered Concentrated Phosphoric Acid)

| Locale | North Carolina | Taiba | Cetulla | Makatea | Morocco | Kola | Florida |
|---|---|---|---|---|---|---|---|
| $P_2O_5$ (wt. %) | 27.00 | 29.30 | 25.27 | 29.33 | 30.19 | 23.20 | 25.86 |
| Ratio of extraction of phosphoric acid (%) | 98.3 | 98.2 | 99.0 | 98.2 | 98.9 | 96.8 | 99.2 |

(Composition of Extraction Residue Small Masses)

| Locale | North Carolina | Taiba | Cetulla | Makatea | Morocco | Kola | Florida |
|---|---|---|---|---|---|---|---|
| CaO (wt. %) | 35.44 | 37.02 | 35.82 | 38.60 | 37.00 | 37.21 | 34.92 |
| $SO_3$ (wt. %) | 43.33 | 45.76 | 44.21 | 47.79 | 45.73 | 46.00 | 43.02 |
| $P_2O_5$ | 1.28 | 1.39 | 1.24 | 1.32 | 1.16 | 1.04 | 1.08 |
| Decomposition ratio (%) | 97.76 | 97.40 | 97.85 | 97.63 | 97.83 | 97.89 | 97.86 |

X-ray diffraction analysis of pasty reaction product: $CaSO_4 \cdot 2H_2O$
X-ray diffraction analysis of heat treated small masses: $CaSO_4 + (CaSO_4 \cdot \frac{1}{2}H_2O)$ From the results shown in Table 6, it will readily be understood that even when phosphate rocks produced in various locales, small masses obtained by conducting the reaction between the phosphate rock and sulfuric acid under such conditions as will satisfy the following requirement:

$$t \leq -0.111P + 0.00334P^2 - 0.000593P^3 + 107.2$$

do not disintegrate throughout the extraction step, and phosphoric acid can be recovered from such small masses at a very high recovery ratio.

EXAMPLE 4

This Example illustrates the significance of variation in the water content in the starting phosphate rock slurry at the time of molding the reaction product between phosphate rock and sulfuric acid into small masses.

The pulverized product of the same phosphate rock produced in Florida as used in Example 1 is employed as the starting phosphate rock in this Example.

Five kinds of the water content in the phosphate rock slurry, namely 20 percent by weight, 30 percent by weight, 40 percent by weight, 50 percent by weight and 70 percent by weight, are chosen.

A prescribed amount of water is added to 2 Kg of the pulverized phosphate rock, and they are blended for about 10 minutes, following which the resulting slurry is reacted with 94 % sulfuric acid added in an amount of 0.9 equivalent to the calcium component contained in the starting phosphate rock, namely in an amount of about 1.51 Kg. The mixing reaction is accomplished by simultaneously pouring the phosphate rock slurry and 94% sulfuric acid into a mixing reaction tank equipped with agitation vanes.

In the same manner as described in Example 1, the resulting reaction mixture is dried, molded and heat-treated to obtain heat-treated small masses. The mixing state at the time of addition of sulfuric acid is observed, and the time required for converting the reaction mixture to a moldable state is measured at the drying and molding step. Further, with respect to each sample, the static disintegration ratio and dynamic disintegration ratio are determined.

These results are shown in Table 7.

The small masses of the phosphate rock-sulfuric acid reaction product are washed sufficiently with water to remove soluble phosphoric acid component completely, and the contents of CaO and $P_2O_5$ are analyzed in the residue composed mainly of gypsum, from which the decomposition ratio based on $P_2O_5$ contained in the starting phosphate rock is calculated. Results are shown in Table 7.

Table 7

| Water content in slurry (wt. %) | 20 | 30 | 40 | 50 | 70 |
|---|---|---|---|---|---|
| Sulfuric acid mixing state | slightly good | good | good | good | good |
| Time required for molding (minutes) | 35–40 | 40–45 | 55–60 | 80–85 | 160–180 |
| Static disintegration ratio (Ds) | 33 | 3 | 0 | 0 | 0 |
| Dynamic disintegration ratio (Dd) | 80 | 17 | 2 | 6 | 10 |
| Mixing reaction temperature | 35–68°C | 58–64°C | 65.70°C | 85–90°C | 100–105°C |
| Theoretical temperature upper limit | 10.5°C. | 65.2°C | 88.1°C. | 98.9°C | 105.4°C |
| X-ray diffraction analysis of pasty reaction product | $CaSO_4.1/-2H_2O$ + $CaSO_4$ + $CaSO_4.2H_2O$ | $CaSO_4.2H_2O$ | $CaSO_4.2H_2O$ | $CaSO_4.2H_2O$ | $CaSO_4.2H_2O$ |
| X-ray diffraction analysis of heat-treated small masses | | $CaSO_4$. (+$CaSO_4$.½$H_2O$) | | | |
| (Analysis of main components of residual small masses) | | | | | |
| CaO (wt. %) | 34.22 | 34.97 | 34.86 | 35.64 | 35.70 |
| $P_2O_5$ (wt. %) | 2.50 | 0.98 | 0.77 | 0.53 | 0.68 |
| Decomposition ratio (%) | 89.45 | 95.95 | 96.80 | 97.85 | 97.25 |

From the above results, it will readily be understood that in view of the mixing state the water content of 30 percent by weight or higher in the phosphate rock slurry is preferred and that in view of the drying and molding operation easiness a water content of 50 percent by weight or lower is preferred. At any rate, it will be understood that even if the water content in the phosphate slurry is varied, when the mixing reaction between the phosphate rock slurry and sulfuric acid is conducted under such conditions as will satisfy the following requirement:

$t \leq -0.111P + 0.00334P^2 - 0.000593P^3 + 107.2$ it is possible to obtain non-disintegrable small masses.

EXAMPLE 5

This Example illustrates an embodiment where a solution of phosphoric acid is employed instead of water when the slurry of the starting phosphate rock is prepared.

The same pulverized phosphate rock produced in Florida as employed in Example 1 is chosen as the starting phosphate rock in this Example.

A phosphoric acid solution having a concentration indicated in Table 8 given below is added in an amount indicated in Table 8 to 2 Kg of the starting phosphate rock, and they are sufficiently mixed and agitated for about 10 minutes. Then, the resulting slurry is mixed and reacted with 94% sulfuric acid added in an amount of 0.9 equivalent to the calcium component (CaO) contained in the starting phosphate rock, namely in an amount of about 1.51 Kg. The mixing reaction is accomplished by pouring simultaneously the phosphate rock slurry and 94% sulfuric acid into a mixing reaction tank equipped with agitation vanes, and the temperature of the reaction mixture is so adjusted as to satisfy the following condition at the mixing reaction:

$t = -0.111P + 0.00334P^2 - 0.00059P^3 + 107.2$

Namely, the reaction temperature is maintained at a level not exceeding the calculated theoretical upper limit of the reaction temperature indicated in Table 8. After the pouring of the phosphate rock slurry and 94 % sulfuric acid into the mixing reaction tank, the mixture is sufficiently agitated for about 30 minutes. In the same manner as described in Example 1, the reaction mixture is dried, molded and heat-treated to obtain small masses. The static disintegration ratio and dynamic disintegration ratio of the so formed small masses are determined, and the CaO and $P_2O_5$ contents in the washing residue of the pasty reaction product are analyzed, from which the decomposition ratio based on $P_2O_5$ contained in the starting phosphate rock is calculated. Reslts are shown in Table 8.

Table 8

| Phosphoric acid solution concentration (wt.%) ($P_2O_5$ %) | 2.5 | 5 | 7.5 |
|---|---|---|---|
| Amount of phosphoric acid solution (g) | 1250 | 1250 | 1250 |
| Calculated value of P | 35.8 % | 38.3 % | 40.8 % |
| Calculated upper limit of reaction temperature | 80.3°C | 74.4°C | 67.9°C |
| Actual reaction temperature | 71–79°C | 68–73°C | 60–68°C |
| X-ray diffraction analysis of pasty reaction product | $CaSO_4.2H_2O$ | $CaSO_4.2H_2O$ | $CaSO_4.2H_2O$ $CaSO_4$.½$H_2O$ |
| X-ray diffraction analysis of heat-treated small masses | $CaSO_4$ (+ $CaSO_4$.½$H_2O$) | $CaSO_4$ (+ $CaSO_4$.½$H_2O$) | $CaSO_4$ (+$CaSO_4$.½$H_2O$) |
| Static disintegration ratio (Ds) | 0 | 0 | 0 |
| Dynamic disintegration ratio (Dd) | 6 | 6 | 7 |

(Analysis of washing residue of pasty reaction product)

Table 8-continued

| | | | |
|---|---|---|---|
| CaO (wt.%) | 34.79 | 34.01 | 34.35 |
| $P_2O_5$ (wt.%) | 0.58 | 0.55 | 0.68 |
| Decomposition ratio (%) | 97.60 | 97.67 | 97.13 |

From the results shown in Table 8, it will readily be understood that even if $P_2O_5$ origin other than phosphate rock is added to the starting phosphate rock, when the reaction is carried out under such conditions as will satisfy the following requirement:

$$t \leq -0.111P + 0.00334P^2 - 0.000593P^3 + 107.2$$

it is possible to obtain non-disintegrable small masses of the phosphate rock-sulfuric acid reaction product. Thus, it will also readily be understood that it is possible to use dilute phosphoric acid obtained in the treatment of phosphate rock, for instance, dilute phosphoric acid obtained at the washing step, as the starting material, and to recover it in the form of concentrated phosphoric acid by passing it through the reaction steps of this invention.

EXAMPLE 6

This Example illustrates the criticality of the upper limit of the mixing reaction temperature defined by the following formula:

$$t = -0.111P + 0.00334P^2 - 0.000593P^3 + 107.2$$

in the mixing reaction between phosphate rock and sulfuric acid.

The same pulverized phosphate rock produced in Florida as used in in Example 1 is employed as the starting phosphate rock in this Example.

In order to clarify the relation between the phosphoric acid concentration and the temperature, the water content is varied as 40 percent by weight, 50 percent by weight and 60 percent by weight in the same manner as in Example 4. With the starting phosphate rock slurry having a prescribed water content, the theoretical upper limit of the reaction temperature, i.e., the temperature indicated in Table 9 below, is calculated from the following formula:

$$t = -0.111P + 0.00334P^2 - 0.000593P^3 + 107.2$$

With respect to each of the phosphate rock slurries varying in the water content, the mixing reaction with sulfuric acid is carried out at a temperature higher than the so calculated upper limit and a temperature lower than the so calculated upper limit, respectively.

A prescribed amount of water is added to 2 Kg of the phosphate rock, and they are blended for about 10 minutes. Then, the mixture is mixed and reacted with 94% sulfuric acid added in an amount of 0.9 equivalent to the calcium component contained in the starting phosphate rock, namely in an amount of about 1.51 Kg. The mixing reaction is accomplished by pouring simultaneously the phosphate rock slurry and 94% sulfuric acid into a mixing reaction tank equipped with agitation vanes, and the reaction is carried out at a prescribed temperature indicated in Table 9. In the same manner as in Example 1, the resulting reaction mixture is dried, molded and heat-treated to obtain heat-treated small masses of the reaction product.

The static disintegration ratio and dynamic disintegration of the so obtained heat-treated small masses are determined. Results are shown in Table 9.

Further, in the same manner as in Example 1, the pasty reaction product prior to the drying step is washed, and the composition of the washing residue is analyzed to obtain the values of CaO and $P_2O_5$ contents, from which the decomposition ratio of the phosphoric acid component in the pasty reaction product is calculated based on the analyzed CaO and $P_2O_5$ contents in the starting phosphate rock. Results are also shown in Table 9.

Table 9

| Water content in phosphate rock slurry (wt.%) | 40 | 40 | 50 | 50 | 60 | 60 |
|---|---|---|---|---|---|---|
| Calculated upper limit of reaction temperature | 88.1°C. | 88.1°C. | 98.9°C. | 98.9°C. | 103.2°C. | 103.2°C. |
| Actual reaction temperature | 75–85°C. | 90–105°C. | 85–95°C. | 100–115°C. | 92–100°C. | 105–120°C. |
| X-ray diffraction analysis of pasty reaction product | $CaSO_4.2H_2O$ | $CaSO_4$ $CaSO_4.\tfrac{1}{2}H_2O$ | $CaSO_4.2H_2O$ | $CaSO_4$ $CaSO_4.\tfrac{1}{2}H_2O$ | $CaSO_4.2H_2O$ | $CaSO_4$ $CaSO_4.\tfrac{1}{2}$ |
| X-ray diffraction analysis of heat-treated small masses | | | $CaSO_4$ (+$CaSO_4.\tfrac{1}{2}H_2O$) | | | |
| Static disintegration ratio (Ds) | 0 | 100 | 0 | 87 | 0 | 70 |
| Dynamic disintegration ratio (Dd) | 2 | 100 | 6 | 100 | 10 | 92 |
| (Analysis values of washing residue of pasty reaction product | | | | | | |
| CaO (wt. %) | 34.42 | 34.78 | 34.88 | 35.39 | 35.00 | 35.27 |
| $P_2O_5$ (wt. %) | 0.65 | 0.67 | 0.54 | 0.57 | 0.69 | 0.63 |
| Decomposition ratio (%) | 97.27 | 97.22 | 97.76 | 97.67 | 97.15 | 97.42 |

From the results shown in Table 9, it will readily be understood that the disintegrability of the small masses is greatly influenced by the temperature at which phosphate rock and sulfuric acid are mixed and reacted.

It will also be understood that the upper limit of the above temperature is defined by the following formula:

$$t = -0.111P + 0.00334P^2 - 0.000593P^3 + 107.2$$

and in order to obtain small masses excellent in the nondisintegrability, the following condition $$t \leq -0.111P + 0.00334P^2 - 0.000593P^3 + 107.2$$

should be satisfied.

EXAMPLE 7

This example illustrates an embodiment in which hexafluorosilicic acid is intimately mixed with pulverized phosphate rock and the water content in the phosphate rock slurry and the temperature condition at the mixing reaction between the phosphate rock slurry and sulfuric acid are changed.

The same pulverized phosphate rock produced in Florida as used in Example 1 is employed as the starting phosphate rock in this Example. Hexafluorosilicic acid ($H_2SiF_6$) as a disintegration-preventing agent is added to the starting phosphate rock in an amount, as reckoned as fluorine (F), of 0.12 equivalent to the calcium component (CaO) contained in the starting phosphate rock. The concentration of hexafluorosilicic acid is adjusted depending on the prescribed water content of the phosphate rock slurry.

As the water content of the phosphate rock slurry, 40 percent by weight, 50 percent by weight and 60 percent by weight are chosen.

The amount and concentration of the hexafluorosilicic acid added to 2 Kg of the starting pulverized phosphate rock, and the water content in the resulting phosphate rock slurry are as shown in Table 10.

Table 10

| Water content in phosphate rock slurry (wt. %) | 40 | 50 | 60 |
|---|---|---|---|
| Concentration of hexafluorosilicic acid solution (wt. %) | 15.26 | 10.70 | 7.55 |
| Amount of hexafluorosilicic acid solution added (g) | 1580 | 2240 | 3180 |

Hexafluorosilicic acid having a concentration indicated in Table 10 is added in an amount indicated in Table 10 to 2 Kg of the pulverized phosphate rock, and they are blended for about 10 minutes. Then, the resulting phosphate rock slurry is incorporated with 95% sulfuric acid ($H_2SO_4$) added in an amount of 0.9 equivalent to the calcium component (CaO) contained in the starting phosphate rock, namely in an amount of about 1.51 kg. They are mixed and reacted at a temperature higher than the upper limit defined by the following formula $$t = -0.111P + 0.00334P^2 - 0.000593P^3 + 107.2$$

and at a temperature lower than said upper limit, respectively. Namely, the mixing reaction between the phosphate rock and sulfuric acid is carried out at temperature conditions indicated in Table 11 given below.

In the same manner as in Example 1, the resulting reaction product is dried, molded and heat-treated to obtain heat-treated small masses of the reaction product. Then, the static disintegraton ratio and dynamic disintegration ratio of the so obtained heat-treated small masses are determined. Results are shown in Table 11.

In the same manner as described in Example 1, the pasty reaction product prior to drying is washed and the washing residue is analyzed to obtain the CaO and $P_2O_5$ contents in the washing residue, from which the decomposition ratio of the phosphoric acid component in the pasty reaction product prior to drying is determined based on the CaO and $P_2O_5$ contents in the starting phosphate rock. Results are also shown in Table 11.

Table 11

| Water content in slurry (wt. %) | 40 | 40 | 50 | 50 | 60 | 60 |
|---|---|---|---|---|---|---|
| Calculated upper limit of reaction temperature | 88.1°C | 88.1°C | 98.9°C | 98.9°C | 103.2°C | 103.2°C |
| Actual reaction temperature | 74–86°C | 90–107°C | 88–95°C | 100–110°C | 92–100°C | 105–120°C |
| X-ray diffraction analysis of pasty reaction product | $CaSO_4 \cdot 2H_2O$ | $CaSO_4 \cdot \frac{1}{2}H_2O$, $CaSO_4$ | $CaSO_4 \cdot 2H_2O$ | $CaSO_4 \cdot \frac{1}{2}H_2O$, $CaSO_4$ | $CaSO_4 \cdot 2H_2O$ | $CaSO_4 \cdot \frac{1}{2}H_2O$, $CaSO_4$ |
| X-ray diffraction of heat-treated small masses | | | $CaSO_4$ (+ $CaSO_4 \cdot \frac{1}{2}H_2O$) | | | |
| Static disintegration ratio (Ds) | 0 | 84 | 0 | 80 | 0 | 52 |
| Dynamic disintegration ratio (Dd) | 0 | 95 | 0 | 90 | 0 | 78 |
| (Analysis of composition of washing residue of pasty reaction product) | | | | | | |
| CaO (wt. %) | 35.09 | 36.38 | 35.19 | 37.16 | 35.44 | 35.06 |
| $P_2O_5$ (wt. %) | 0.58 | 0.48 | 0.55 | 0.39 | 0.56 | 0.49 |
| Decomposition ratio (%) | 97.61 | 98.10 | 97.75 | 98.48 | 97.70 | 97.99 |

From the results shown in Table 11, it will readily be understood that even if hexafluorosilicic acid is added as the disintegration-preventing agent, the disintegrability of the small masses is influenced by the temperature at the mixing reaction between phosphate rock and sulfuric acid.

Further, when results obtained in this Example are compared with results obtained in Example 5, it will be understood that addition of hexafluorosilicic acid gives a better dynamic non-disintegrability to the small masses if compared under the same conditions, and also improves the decomposition ratio.

Also from the results obtained in this Example, it is confirmed that in order to obtain excellent nondisintegrable small masses of the reaction product between phosphate rock and sulfuric acid, it is important to conduct the reaction under such conditions that the following requirement is satisfied:

$$t \leq -0.111P + 0.00334P^2 - 0.000593P^3 + 107.2$$

EXAMPLE 8

This Example illustrates the influence of the amount of sulfuric acid on characteristic properties of the resulting small masses of the phosphate rock-sulfuric acid reaction product.

The same pulverized phosphate rock produced in Florida as employed in Example 1 is chosen as the starting phosphate rock in this Example. To 2 Kg of the phosphate rock is added 1250 ml of water, and they are sufficiently agitated and mixed for about 10 minutes in a mixing tank equipped with agitation vances. To the resulting phosphate rock slurry is added 94% sulfuric acid in an amount of 0.8 – 1.1 equivalents to the calcium component (CaO) contained in the slurry. The reaction, drying, molding and heat treatment are carried out in the same manner as in Example 2 to obtain heat-treated small masses of the reaction product. The static disintegration ratio and dynamic disintegration ratio of the so obtained heat-treated small masses are determined. Results are as shown in Table 12.

In the same manner as described in Example 1, the pasty reaction product prior to drying is washed, and the composition of the washing residue is analyzed to obtain CaO and $P_2O_5$ contents in the washing residue, from which the decomposition ratio of the phosphoric acid component in the pasty reaction prior to drying is calculated based on the CaO and $P_2O_5$ contents in the starting phosphate rock. Results are shown in Table 12.

Table 12

| Equivalent of sulfuric | 0.80 | 0.90 | 0.95 | 1.00 | 1.10 |
|---|---|---|---|---|---|
| Amount (Kg) of 94% sulfuric acid | 1.34 | 1.51 | 1.6 | 1.68 | 1.84 |
| Reaction temperature | 70–80°C | 65–82°C | 72–78°C | 72–80°C | 70–79°C |
| Calculated upper limit of reaction temperature | 85.3°C | 85.3°C | 85.3°C | 85.3°C | 85.3°C |
| X-ray diffraction of pasty reaction product | $CaSO_4.2H_2O$ | $CaSO_4.2H_2O$ | $CaSO_4.2H_2O$ | $CaSO_4.2H_2O$ | $CaSO_4.2H_2O$ |
| X-ray diffraction of heat-treated small masses | $CaSO_4$ | $CaSO_4$ | $CaSO_4$ | $CaSO_4$ | $CaSO_4$ |
| Static disintegration ratio (Ds) | 0 | 0 | 0 | 35 | 100 |
| Dynamic disintegration ratio (Dd) | 0 | 10 | 20 | 60 | 100 |
| (Analysis of composition of washing residue of pasty reaction product) | | | | | |
| CaO (wt. %) | 35.49 | 35.70 | 34.80 | 36.95 | 35.99 |
| $P_2O_5$ (wt. %) | 2.91 | 0.73 | 0.69 | 0.60 | 0.53 |
| Decomposition ratio (%) | 88.15 | 97.05 | 97.13 | 97.65 | 97.87 |

From the results shown in Table 12, it will readily be understood that even if the reaction is carried out under such conditions as will satisfy the following requirement:

$t \leq -0.111P + 0.00334P^2 - 0.000593P^3 + 107.2$ when the amount of sulfuric acid exceeds 1.0 equivalent, it is difficult to maintain the small masses of the reaction product in the non-disintegrable state. Namely, it will be understood that it is desired that the reaction is carried out with use of sulfuric acid in an amount not exceeding 1.0 equivalent under such conditions as will satisfy the following requirement:

$t \leq -0.111P + 0.00334P^2 - 0.000593P^3 + 107.2$

EXAMPLE 9

This Example illustrates the significance of variation in the concentration of sulfuric acid to be used in the reaction.

In the preceding Examples, it is illustrated that the small masses of the reaction product can be maintained in the non-disintegrable state throughout the whole steps by controlling the reaction temperature so as to satisfy the following condition:

$t \leq -0.111P + 0.00334P^2 - 0.000593P^3 + 107.2$

In this Example, use of dilute sulfuric acid, which is believed to be effective for preventing the generation of heat in the reaction mixture and hence, maintaining the reaction temperature at a low level, is illustrated.

The same pulverized phosphate rock produced in Florida as used in Example 1 is employed as the starting phosphate rock in this Example. As the sulfuric acid concentration, 94 percent by weight, 72 percent by weight and 60 percent by weight are chosen.

The preparation of the phosphate rock slurry, the reaction of the phosphate rock slurry with sulfuric acid and the drying, molding and heat treatment of the reaction product are carried out under conditions indicated in Table 13 in the same manner as described in Example 2, to obtain heat-treated small masses of the reaction product.

The time required for attaining the moldable state in the reaction product at the drying and molding step is measured, and the static disintegration ratio and dynamic disintegration ratio of the resulting small masses of the reaction product are determined. Results are shown in Table 13. Further, the small masses of the reaction product are washed sufficiently with water to remove the soluble phosphoric acid component completely, and the CaO and $P_2O_5$ contents of the residue composed mainly of gypsum are determined, from which the decomposition ratio of the phosphoric acid component based on $P_2O_5$ contained in the starting phosphate rock is calculated. Results are shown in Table 13.

Table 13

| Amount used of phosphate rock (Kg) | 2 | 2 | 2 | 2 | 2 |
|---|---|---|---|---|---|
| Amount of water (g) | 1,250 | 1,250 | 1,250 | 760 | 390 |
| Concentration of sulfuric acid used | 94 % | 72 % | 60 % | 72 % | 60 % |
| Equivalent of sulfuric acid used | 0.9 | 0.9 | 0.9 | 0.9 | 0.9 |
| Amount of sulfuric acid used (Kg) | 1.51 | 2.00 | 2.37 | 2.00 | 2.37 |
| Calculated upper limit of reaction temperature | 85.3°C | 95.7°C | 102.0°C | 85.3°C | 85.3°C |
| Actual reaction temperature | 65–82°C | 44–64°C | 23–62°C | 60–75°C | 58–73°C |
| X-ray diffraction of pasty reaction product | $CaSO_4.2H_2O$ | $CaSO_4.2H_2O$ | $CaSO_4.2H_2O$ | $CaSO_4.2H_2O$ | $CaSO_4.2H_2O$ |
| X-ray diffraction of heat-treated small masses | $CaSO_4$ | $CaSO_4.½H_2O$ $CaSO_4$ | $CaSO_4.½H_2O$ $CaSO_4$ | $CaSO_4$ | $CaSO_4$ |
| Time required for molding (minutes) | 55–60 | 75–80 | 90–140 | 55–60 | 55–60 |
| Static disintegration ratio (Ds) | 0 | 0 | 0 | 0 | 0 |
| Dynamic disintegration ratio (Dd) | 10 | 0 | 0 | 10 | 18 |
| (Analysis of composition of residual small masses | | | | | |
| CaO (wt. %) | 35.68 | 34.18 | 34.23 | 34.63 | 35.66 |
| $P_2O_5$ (wt. %) | 0.58 | 0.66 | 0.76 | 0.52 | 0.60 |
| Decomposition ratio (%) | 97.65 | 97.32 | 96.79 | 97.83 | 97.57 |

From the results shown in Table 13, it will readily be understood that by lowering the sulfuric acid concentration it is made possible to reduce the generation of heat at the reaction and to maintain the temperature easily at a low level, and that the reduction of the sulfuric acid concentration is suitable for satisfying the reaction temperature condition specified in this invention. Anyhow, it will be readily understood that even if the sulfuric acid concentration is changed, non-disintegrable small masses can be obtained according to this invention.

EXAMPLE 10

This Example illustrates an embodiment in which hydrofluoric acid, hexafluorosilicic acid or amorphous silica is used as a disintegration-preventing agent and 0.8 – 1.1 equivalents, to the calcium component (CaO) contained in phosphate rock, of sulfuric acid is mixed and reacted with phosphate rock in the presence of such disintegration-preventing agent under such conditions as will satisfy the following requirement:
$$t \leq -0.111P + 0.00334P^2 - 0.000593P^3 + 107.2$$
The same pulverized phosphate rock produced in Florida as employed in Example 1 is chosen as the starting phosphate rock in this Example.

Hydrofluoric acid, hexafluorosilicic acid or amorphous silica is added in the form of an aqueous solution to the starting phosphate rock, the concentration and amount of the disintegration-preventing agent being shown in Table 14 given below. The mixture is blended for about 10 minutes. Then, the resulting slurry is mixed and reacted with 94% sulfuric acid in an amount of 0.8 – 1.1 equivalents to the calcium component (CaO) contained in the phosphate rock, namely in an amount indicated in Table 14. The mixing reaction between the phosphate rock and sulfuric acid is accomplished by pouring simultaneously the phosphate rock slurry and sulfuric acid into a reaction vessel, and the mixing reaction conditions are so controlled that the following requirement is satisfied:
$$t \leq -0.111P + 0.00334P^2 - 0.000593P^3 + 107.2$$
Namely, the mixing reaction temperature is maintained below the level indicated in Table 14.

which no disintegration-preventing agent is used, even if the reaction is carried out under such conditions as will satisfy the following requirement:
$$t \leq -0.111P + 0.00334P^2 - 0.000593P^3 + 107.2$$
When the amount of sulfuric acid added exceeds 1.0 equivalent, it is difficult to maintain the small masses of the reaction product in the non-disintegrable state. When the results obtained in this Example are compared with the results obtained in Example 7, it will be apparent that better static non-disintegrability and dynamic non-disintegrability can be obtained by addition of the disintegration-preventing agent when compared under the same conditions and the addition of the disintegration-preventing agent improves the decomposition ratio.

EXAMPLE 11

This Example illustrates the significance of variation in the time for the reaction between phosphate rock and sulfuric acid and its influence on the molding of heat-treated small masses.

The same pulverized phosphate rock produced in Florida as used in Example 1 is chosen as the starting phosphate rock in this Example.

Table 14

| Additive | Hydrofluoric acid | Hexafluorosilicic acid | | | Amorphous silica |
|---|---|---|---|---|---|
| Concentration (wt.%) | 2.67 | 15.26 | | | 8.03 |
| Amount added as solution (g) | 1580 | 1580 | | | 1580 |
| Calculated upper limit of reaction temperature (°C) | 88.1 | 88.1 | | | 88.1 |
| Equivalent of sulfuric acid used | 0.8 | 0.9 | 1.0 | 1.1 | |
| Amount of sulfuric acid used (Kg) | 1.34 | 1.51 | 1.68 | 1.84 | |

The mixture formed by pouring the phosphate rock and sulfuric acid under the above-mentioned conditions is agitated, reacted, dried, molded and heat-treated according to the procedures described in Example 2 to obtain heat-treated small masses of the reaction product. The static disintegration ratio and dynamic disintegration ratio of the so obtained heat-treated small masses are determined. Further, the CaO and $P_2O_5$ contents in the residue composed mainly of gypsum, which is left when the heat-treated small masses are washed with water, are analyzed, and from these values, the decomposition ratio of the phosphoric acid component based on $P_2O_5$ contained in the starting phosphate rock is calculated.

Results are shown in Table 15.

To 2 Kg of the pulverized phosphate rock is added 1250 ml of water, and they are intimately blended. Then, the resulting mixture is incorporated with sulfuric acid in an amount of 0.9 equivalent to the calcium component (CaO) contained in the phosphate rock. Namely, (1) about 1.51 kg of 94% sulfuric acid, (2) about 2.0 Kg of 72 % sulfuric acid or (3) about 2.37 Kg of 60 % sulfuric acid is added to the above mixture formed from 2 Kg of the pulverized phosphate rock and 1250 ml of water. The resulting mixture is agitated for 5 minutes while maintaining the temperature of the mixture at a level not exceeding the upper limit defined by the formula ( $t = f(P)$ ) (85.3°C. in the case of (1), 95.7°C. in the case of (2) and 102.0°C. in the case of (3) ), to thereby obtain a plastic mixture. The so formed plastic mixture is further agitated for 15, 30, 45

Table 15

| Disintegration-preventing agent | Amount of sulfuric acid (equivalent) | Reaction temperature (°C) | X-ray diffraction of pasty reaction product | Static disintegration ratio (Ds) | Dynamic disintegration ratio (Dd) | Decomposition ratio (%) |
|---|---|---|---|---|---|---|
| Hydrofluoric acid | 0.8 | 72–85 | $CaSO_4 \cdot 2H_2O$ | 0 | 0 | 95.87 |
| | 0.9 | 70–83 | " | 0 | 6 | 97.62 |
| | 1.0 | 55–80 | " | 20 | 45 | 98.11 |
| | 1.1 | 66–81 | " | 100 | 100 | |
| Hexafluorosilicic acid | 0.8 | 80–83 | " | 0 | 0 | 96.54 |
| | 0.9 | 70–82 | " | 0 | 4 | 97.77 |
| | 1.0 | 62–80 | " | 13 | 35 | 98.27 |
| | 1.1 | 72–79 | " | 100 | 100 | |
| Amorphous silica | 0.8 | 70–78 | $CaSO_4 \cdot 2H_2O$ | 0 | 0 | 94.89 |
| | 0.9 | 68–82 | " | 0 | 6 | 97.57 |
| | 1.0 | 58–77 | " | 25 | 45 | 98.08 |
| | 1.1 | 63–81 | " | 100 | 100 | |

From the results shown above, it will be readily understood that as in the embodiment of Example 7 in or 60 minutes.

In the same manner as described in Example 1, the so formed reaction product is dried, molded and heat-treated to obtain heat-treated small masses.

The above reaction product is washed sufficiently with water, and the CaO and $P_2O_5$ contents are determined with respect to the washing residue composed mainly of gypsum. From the so determined values, the decomposition ratio based on $P_2O_5$ contained in the starting phosphate small masses of the reaction product, the static disintegration ratio and dynamic disintegration ratio and determined.

Results are shown in Table 16.

(namely the static disintegration ratio of 0 percent) is measured.

The heat-treated small masses of the reaction product is washed sufficiently with water, and the CaO and $P_2O_5$ contents are determined with respect to the washing residue composed mainly of gypsum. From the so determined values, the deposition ratio based on $P_2O_5$ contained in the starting phosphate rock is calculated and the manufacturing speed is determined. Further, the dynamic disintegration ratio of the heat-treated small masses of the reaction product is determined.

The manufacturing speed is determined in the follow-

Table 16

| Sulfuric acid concentration (%) | Treatment time (min) | Temperature of reaction mixture (°C) | X-ray diffraction of pasty reaction product | Static Disintegration ratio (Ds) | Dynamic Disintegration ratio (Dd) | Decomposition ratio (%) |
|---|---|---|---|---|---|---|
| 94 | 15 | 70 | $CaSO_4.2H_2O$ $CaSO_4.½H_2O$ | 5 | 25 | 97.50 |
|  | 30 | 50 | $CaSO_4.2H_2O$ | 0 | 7 | 98.11 |
|  | 45 | 35 | $CaSO_4.2H_2O$ | 0 | 5 | 98.17 |
|  | 60 | 28 | $CaSO_4.2H_2O$ | 0 | 5 | 98.42 |
| 72 | 15 | 93 | $CaSO_4.2H_2O$ $CaSO_4.½H_2O$ | 5 | 20 | 97.02 |
|  | 30 | 86 | $CaSO_4.2H_2O$ | 0 | 3 | 98.20 |
|  | 45 | 64 | $CaSO_4.2H_2O$ | 0 | 0 | 98.17 |
|  | 60 | 35 | $CaSO_4.2H_2O$ | 0 | 0 | 97.61 |
| 60 % | 15 | 97 | $CaSO_4.2H_2O$ $CaSO_4.½H_2O$ | 7 | 25 | 94.91 |
|  | 30 | 92 | $CaSO_4.2H_2O$ | 0 | 0 | 98.26 |
|  | 45 | 80 | $CaSO_4.2H_2O$ | 0 | 0 | 97.60 |
|  | 60 | 62 | $CaSO_4.2H_2O$ | 0 | 0 | 97.30 |

From the above results, it will readily be understood that if the mixture of the phosphate rock and sulfuric acid is agitated for about 30 minutes after mixing, the calcium component is converted to stable gypsum dihydrate and a non-disintegrable reaction product which is very stable against not only static disintegration but also dynamic disintegration can be obtained.

EXAMPLE 12

This Example illustrates the significance of variation in the heat treatment temperature and time in preparing heat-treated small masses of the reaction product between phosphate rock and sulfuric acid.

The same pulverized phosphate rock produced in Florida as used in Example 1 is chosen as the starting phosphate rock in this Example.

With use of the same amounts of the phosphate rock, water and sulfuric acid as in Example 2, a plastic mixture is formed in the same manner as in Example 2. This plastic mixture is cast on a Teflon treated steel plate in the form of a ribbon having a width of about 10 mm, and this ribbon-like mixture is heat-treated in the stationary state in a drier maintained at 120°, 150°, 180°, 200° or 240°C.

The time required in the above heat treatment for obtaining small masses of the reaction product which do not disintegrate at all when thrown into water ing manner.

At first, 500 g of the heat-treated small masses of the reaction product is packed into an extracting apparatus as described in Example 2, and 250 ml of a primary extraction medium (warm water) is charged into the extraction apparatus. The small masses are heated at 80°–90°C, and allowed to stand still for 30 minutes in the state immersed in the primary extraction medium. Immediately, hot water heated at 90°C. is added dropwise as a displacing extraction medium at a rate of 100 ml per hour. The manufacturing speed is expressed in terms of the time (minutes) from the initiation of recovery of crude phosphoric acid to the point at which the recovery ratio as calculated $P_2O_5$ reaches about 80 percent. (The extraction ratio is expressed, as in Example 2, by the extraction ratio attained when 500 ml of crude phosphoric acid is recovered.) The above value of 80 percent is deemed to be a relatively low value, from the industrial viewpoint. However, since in the case of small masses treated at 240°C. for 25 minutes, the recovery ratio is about 80 percent even when completely washed, the above value of 80 percent is adopted.

Results are shown in Table 17.

Table 17

| Treatment temperature (°C.) | 120 | 150 | 180 | 200 | 240 |
|---|---|---|---|---|---|
| Necessary treatment time (min.) | 300 | 150 | 60 | 30 | 25 |
| Composition of main components of residual small masses | | | | | |
| CaO (wt. %) | 33.14 | 36.55 | 34.18 | 33.03 | 33.90 |
| $P_2O_5$ (wt. %) | 0.49 | 0.60 | 0.53 | 0.52 | 4.18 |
| Decomposition ratio (%) | 97.86 | 97.63 | 97.76 | 97.72 | 82.18 |
| Dynamic disintegration ratio (Dd) | 20 | 4 | 0 | 0 | 0 |
| Manufacturing speed (min.) | 170 | 180 | 180 | 200 | 540 |
| Extraction ratio (%) | 98.7 | 98.3 | 98.5 | 96.4 | 65.3 |

From the above results, the following matters can be seen.

When the treatment is conducted at a lower temperature, it takes a longer time to obtain statically nondisintegrable small masses. In order to shorten the treatment time, it is sufficient to increase the treatment temperature. However, when the treatment temperature exceeds 200°C., the decomposition ratio is lowered, and since the treatment is conducted at a high temperature, condensation of the phosphoric acid component is caused to occur, which results in the propagation of the period of time necessary for recovery of the phosphoric acid component; therefore, the manufacturing speed is drastically lowered. Simultaneously, also the extraction ratio is drastically reduced. Thus, the heat treatment at temperatures exceeding 200°C. is very disadvantageous in preparing phosphoric acid on an industrial scale. In short, the results of this Example clearly indicate that it is much desired that the heat treatment is carried out at a temperature not exceeding 200°C.

EXAMPLE 13

This Example illustrates another embodiments of obtaining heat-treated non-disintegrable small masses of the reaction product.

A plastic mixture is prepared from the same amounts of phosphate rock, water and sulfuric acids as employed in Example 2 under the same conditions in the same manner as in Example 2.

A. A vertical drier of the air-passing type consisting of a glass cylindrical column (having a diameter of 8 cm and a length of 50 cm) provided with a porcelain perforated plate in the lower portion thereof, which is so constructed that hot air is blown in from the lower portion thereof, is packed with, as a heating medium, a pulverized product of small masses obtained by mixing phosphate rock, water and sulfuric acid under the same conditions as above and heat-treating the mixture, and the pulverized product is kept in the fluidized state by means of hot air. In this state, the plastic mixture is fed dropwise into the column. From the lower portion of the column, hot air maintained at 180°C. is fed, and after 20 minutes, hot air maintained at 140°C. is fed. After 60 minutes have passed, heat-treated spherical small masses having non-disintegrability (static) are obtained. In this embodiment, when an opening for withdrawing heattreated spherical small masses is provided in the lower portion of the column and hot air is blown in from said withdrawal opening at a rate sufficient to fluidize the pulverized product packed as the heating medium, it is possible to continuously withdraw the heat-treated spherical masses while separating them from the pulverized product acting as the heating medium. It is also possible to mold the plastic reaction product into spheres in the pulverized product acting as the heating medium, separate the molded sperical small masses from the pulverized product in the same manner as above and then heat-treat the spherical small masses by other means.

The so heat-treated, non-disintegral (static) small masses of the reaction product are subjected to the hot water extraction according to the granule extraction method described in Example 2. The phosphoric acid component is recovered at a recovery ratio of 95.7 % when the treatment is conducted at 180°C. and the recovery ratio is 97.0 % when the treatment is carried out at 140°C. It is thus confirmed that in the small masses heat-treated by the air-passing method the time required for the extraction treatment can be shortened as compared with the case of the small masses heat-treated in the stationary state.

B. The above plastic mixture is molded into columns having a diameter of 2 mm by means of a meat grinder (the mesh size of the perforated plate being 2 mm). When the so formed columns are treated with hot air maintained at 180°C. for 30 minutes, heat-treated small masses having non-disintegrability (static) are obtained. Various types of driers can be used for the heat treatment of the so-molded granular mixture.

When the heat-treated small masses are extracted with hot water according to the granule extraction method as described in Example 2, the phosphoric acid component can be recovered at such a high recovery ratio as 95.6 percent.

C. When the above plastic mixture is molded into agglomerated granules having a size of about 30 mm and allowed to stand still in a drier matintained at 180°C. for 90 minutes, hard agglomerated masses having a size of 25–30 mm are obtained. In this case, if the diameter of the starting agglomerated granules is adjusted below 30 mm, the time required for the heat treatment can be shortened. If desired, the heat-treated agglomerated masses are ground into small particles by means of a grinder or the like.

It is confirmed that the agglomerated masses do not disintegrate when thrown into water.

The heat-treated, agglomerated masses having a diameter of 30 mm, which have been prepared by the above procedures, are extracted according to the granule extraction method as described in Example 2. In this case, the extraction rate and the concentration of the recovered phosphoric acid are lowered, but the phosphoric acid can be recovered at a total recovery ratio of 95 percent.

EXAMPLE 14

This Example illustrates the significance of variation in the extraction solvent in extracting phosphoric acid from the heat-treated small masses of the phosphate rock-sulfuric acid reaction product.

The small masses which have been prepared in the same manner as in Example 1 and having the following composition of the main components:

| | |
|---|---|
| CaO | 26.80% by weight |
| $P_2O_5$ | 18.48 % by weight |
| $SO_3$ | 33.01 % by weight | are chosen as the heat-treated small masses to be extracted.

As the extraction solvent are chosen warm water of about 80°C., a mixed acid solution of 80°C. having a concentration of (5 g of sulfuric acid ($H_2SO_4$) + 5 g of phosphoric acid ($H_3PO_4$) per 100 ml and a sulfuric acid solution of 80°C. having a concentration of 5 g of sulfuric acid ($H_2SO_4$) per 100 ml.

An extraction apparatus such as described in Example 2 is employed as the extraction apparatus.

In this extraction apparatus, heat-treated, non-disintegrable small masses are allowed to stand still in the state immersed in 250 ml of the extraction solvent to elute the phosphoric acid component from the small masses into the extraction solvent. Immediately, the small masses are withdrawn from the top of the apparatus, and warm water maintained at 80°C. is added dropwise as a displacing extraction solvent at a rate of 100 ml per hour. Thus, 200 ml of highly concentrated crude phosphoric acid is recovered. Subsequently, the extraction is continued in the same manner as above by employing warm water maintained at 80°C. as an extraction medium to recover dilute crude phosphoric acid.

Results are as shown in Table 18 give below.

Table 18

| Composition of main components in highly concentrated, recovered crude phosphoric acid | | | |
|---|---|---|---|
| | Warm water | Mixed acid solution | Sulfuric acid solution |
| $P_2O_5$ (wt. %) | 24.27 | 30.33 | 25.91 |
| CaO (wt. %) | 0.56 | 2.48 | 2.61 |
| $SO_3$ (wt. %) | 0.68 | 3.08 | 3.20 |
| $R_2O_3$*) | 1.03 | 1.27 | 1.33 |
| Composition of main components in recovered dilute crude phosphoric acid | | | |
| | Warm water | Mixed acid solution | Sulfuric acid solution |
| $P_2O_5$ (wt. %) | 5.79 | 6.04 | 5.59 |
| CaO (wt. %) | 0.09 | 0.58 | 0.62 |
| $SO_3$ (wt. %) | 0.10 | 0.72 | 0.89 |
| Recovery ratio (%) | 92.95 | 97.00 | 97.40 |

$R_2O_3$: sum of $Al_2O_3$ and $Fe_2O_3$

B. The small masses obtained by conducting the mixing, reaction and heat treatment under the same conditions as in Example 1 except that the amount of sulfuric acid is changed to 0.8 equivalent to the calcium component (CaO) contained in the starting rock, and having the following composition of the main components:

| CaO | 29.44 % by weight |
| $P_2O_5$ | 20.36 % by weight |
| $SO_3$ | 32.89 % by weight | are employed as to small masses to be extracted.

As the extraction solvent are chosen and used warm water maintained at 80°C., a mixed acid solution of 80°C. having a concentration of (5 g of phosphoric acid ($H_3PO_4$) + 10 g of sulfuric acid ($H_2SO_4$) ) per 100 ml and a sulfuric acid solution of 80°C. having a concentration of 5 g of sulfuric acid ($H_2SO_4$) per 100 ml. The extraction is carried out in the same manner as in A) above with use of the same extraction apparatus as employed in A) above.

Results are as shown in Table 19.

Table 19

| Composition of main components in highly concentrated, recovered crude phosphoric acid | | | |
|---|---|---|---|
| | Warm water | Mixed acid solution | Sulfuric acid solution |
| $P_2O_5$ | 21.57 | 32.74 | 27.57 |
| CaO | 1.04 | 1.25 | 1.32 |
| $SO_3$ | 0.82 | 2.47 | 2.90 |
| $R_2O_3$*) | 0.79 | 0.83 | 0.85 |
| Composition of main components in recovered dilute crude phosphoric acid | | | |
| | Warm water | Mixed acid solution | Sulfuric acid solution |
| $P_2O_5$ | 7.35 | 7.38 | 6.44 |
| CaO | 0.09 | 0.60 | 0.57 |
| $SO_3$ | 0.13 | 0.85 | 0.71 |
| Recovery ratio | 81.17 % | 95.06 % | 95.45 % |

$R_2O_3$*): Sum of $Al_2O_3$ and $Fe_2O_3$

From the results shown above, it will readily be understood that when an acid solution is employed as the extraction solvent instead of water, better results are obtained. It is especially noted that phosphoric acid of a high concentration can be recovered in a high yield when the defficiency of the amount of the acid used in the reaction is compensated at the time of extraction.

It is unexpectely noted that even when a sulfuric acid solution is used as the extraction medium, the small masses of the reaction product do not disintegrate throughout the extraction step but retain the original form of small masses stably.

EXAMPLE 15

This Example illustrates a process for preparing concentrated phosphoric acid.

As described above, iy is possible to obtain concentrated phosphoric acid by employing a rotary drum extraction apparatus of the counter-current type such as described in Example 1. In this Example, an embodiment in which a concentrated phosphoric acid solution is prepared by employing an extraction column as described in Example 2 is illustrated. The small masses prepared by conducting the mixing, reaction and heat treatment under the same conditions as in Example 1 and having the following composition of the main components:

| CaO | 26.80 % by weight |
| $P_2O_5$ | 18.48 % by weight |
| $SO_3$ | 33.01 % by weight | are used as the starting small masses to be extracted.

An extraction system provided with 4 extraction columns as described in Example 2 is employed. In each column, 500 g of the small masses are packed. At first, 250 ml of warm water of 85°C. is charged as the extraction medium in the first column and the heat-treated small masses are allowed to stand still at 85° – 90°C. for about 150 minutes in the state immersed in the extraction medium. By this operation, the phosphoric acid component is eluted into the medium from the small masses. Immediately, as a displacing extraction medium, warm water heated at 85°C. is added dropwise at a rate of 100 ml per hour from the column head. Thus, 250 ml of highly concentrated crude phosphoric acid is recovered. Subsequently, the extraction is continued in the same manner as above by employing warm water as the extraction medium to obtain 250 ml of dilute crude phosphoric acid.

In the subsequent columns, warm water washing is conducted in the same manner as described above. In the subsequent columns, the immerse extraction is carried out similarly with use of the highly concentrated crude phosphoric acid recovered from the preceding column, the displacing extraction is carried out similarly with use of dilute phosphoric acid recovered from the preceding column, and washing is carried out similarly by employing the washing liquor recovered in the preceding column.

Compositions of main components of high concentrated crude phosphoric acids and dilute crude phosphoric acid recovered from each column are as shown in Table 20.

Table 20

Composition of main components in highly concentrated, recovered crude phosphoric acid

|  | 1st column | 2nd column | 3rd column | 4th column |
|---|---|---|---|---|
| $P_2O_5$ (wt. %) | 24.03 | 37.20 | 44.68 | 47.06 |
| CaO (wt. %) | 0.61 | 0.79 | 0.91 | 1.20 |
| $SO_3$ (wt. %) | 0.83 | 0.95 | 1.68 | 2.08 |

Composition of main components in recovered dilute crude phosphoric acid

|  | 1st column | 2nd column | 3rd column | 4th column |
|---|---|---|---|---|
| $P_2O_5$ (wt. %) | 5.54 | 12.15 | 18.35 | 20.26 |
| CaO (wt. %) | 0.10 | 0.24 | 0.32 | 0.45 |
| $SO_3$ (wt. %) | 0.13 | 0.31 | 0.41 | 0.66 |

From the results shown above, it will readily be understood that in the granule extraction method of the multi-stage type employing a plurality of extraction columns, highly concentrated phosphoric acid can be obtained as in the method using a rotary drum extraction apparatus of the counter-current type.

EXAMPLE 16

This Example illustrates an embodiment in which dehydrated n-butyl alcohol is used as the extraction solvent for extracting the phosphoric acid component from heat-treated small masses of the phosphate rock-sulfuric acid reaction product.

The small masses obtained by conducting the mixing, reaction and heat treatment in the same manner as in Example 1 except that the heat treatment is carried out at 160°C. for 1 hour or at 200°C. for 30 minutes are used as the starting small masses to be extracted.

Dehydrated n-butyl alcohol is chosen and used as the extraction solvent. Soxhlet's extractor is used as the extraction apparatus. The extractor is so arranged that the temperature of n-butyl alcohol is maintained at 80°C. in the extraction zone and the criculation frequency of the solvent is one time per 5 minutes. The extraction is continued for 2 hours from the start of circulation of the solvent. After completion of the extraction, n-butyl alcohol sticked to the residue is recovered under reduced pressure. The n-butyl alcohol extract containing phosphoric acid is first subjected to distillation under reduced pressure to separate n-butyl alcohol from the phosphoric acid component. Next, the resulting liquor containing phosphoric acid in a greater amount than n-butyl alcohol is subjected to steam distillation under reduced pressure to separate a phosphoric acid solution from a mixture of n-butyl alcohol and water while preventing esterification of n-butyl alcohol. Thus, a phosphoric acid solution is recovered.

The $P_2O_5$ and CaO contents of the residue left after n-butyl alcohol separation are determined, and from these values, the decomposition ratio based on $P_2O_5$ contained in the starting phosphate rock is calculated. Results are as shown in Table 21.

The composition of the main components of the recovered phosphoric acid is also shown in Table 21.

Table 21

| Composition of main components in residual small masses | 160°C × 60 min treatment | 200°C × 30 min treatment |
|---|---|---|
| CaO (wt. %) | 33.12 | 32.08 |
| $P_2O_5$ (wt. %) | 3.63 | 4.26 |
| Decomposition ratio (%) | 84.0 | 80.78 |
| Water content in heat-treated small masses | 7.8 % | 3.6 % |
| Composition of main components in recovered phosphoric acid | 160°C × 60 min treatment | 200°C × 30 min treatment |
| $P_2O_5$ (wt. %) | 49.08 | 35.46 |
| CaO (wt. %) | 0.03 | 0.02 |
| $R_2O_3$*) (wt. %) | 0.32 | 0.25 |

*) $R_2O_3$ : sum of $Al_2O_3$ and $Fe_2O_3$

Small masses obtained by conducting the heat treatment at 160°C., are extracted with n-butanol to recover the phosphoric acid component and the residue left after separation of n-butanol is re-treated with dilute sulfuric acid and washed with water. The $P_2O_5$ and CaO contents of the resulting residue are determined, and the overall recovery ratio based on $P_2O_5$ contained in the starting phosphate rock is calculated. Results are shown below.

| Components | |
|---|---|
| CaO | 34.78 % by weight |
| $P_2O_5$ | 0.4 % by weight |
| Recovery ratio | 98.3 % |

Throughout the above extraction and re-treatment procedures, the small masses do not disintegrate but retain the original form of small masses.

From the foregoing results, it will be readily be understood that the phosphoric acid component can be recovered even with use of an organic solvent, especially n-butyl alcohol, and that the phosphoric acid component not recovered by extraction with n-butyl alcohol can be recovered by the treatment with dilute sulfuric acid or the like.

EXAMPLE 17

This Example illustrates a process for preparing phosphoric acid in which a fluorine compound is added as a disintegration-preventing agent in preparing the phosphate rock-sulfuric acid reaction product.

The same pulverized phosphate rock produced in Florida as employed in Example 1 is used as the starting phosphate rock in this Exmaple.

A fluorine compound indicated in Table 22 given below is added as the disintegration-preventing agent to the starting phosphate rock in an amount, as calculated as fluorine, of 0.15 equivalent to the calcium component (CaO) in the phosphate rock, and they are mixed homogeneously and intimately. $CaF_2$, $CaSiF_6$, $CaH_2F_4$, $NaF$, $Na_2SiF_6$ and $K_2SiF_6$ are chosen and used as the disintegration-preventing agent.

To the resulting mixture is added 98 % sulfuric acid in an amount of 0.9 or 1.0 equivalent to the calcium component in the starting phosphate rock. The reaction of the mixture, drying, molding and heat treatment are conducted in the same manner as in Example 2 to obtain small masses of phosphate rock-sulfuric acid reaction product.

The static disintegration ratio and dynamic disintegration ratio, the content of the fluorine component caught on the reaction product in the form of a salt and the decomposition ratio based on $P_2O_5$ contained in the starting phosphate rock are determined to obtain results shown in Table 22.

Table 22

| Disintegration-preventing agent | Amount added of sulfuric acid (equivalent) | Static disintegration ratio (Ds) | Dynamic-disintegration ratio (Dd) | Amount caught of F (equivalent) | Decomposition ratio (%) |
| --- | --- | --- | --- | --- | --- |
| $CaF_2$ | 0.9 | 0 | 2 | 0.10 | 95.48 |
| $CaF_2$ | 1.0 | 0 | 15 | 0.05 | 98.10 |
| $CaSiF_6$ | 0.9 | 0 | 0 | 0.12 | 95.61 |
| $CaSiF_6$ | 1.0 | 0 | 12 | 0.06 | 97.83 |
| $CaH_2F_4$ | 0.9 | 0 | 0 | 0.10 | 96.00 |
| $CaH_2F_4$ | 1.0 | 0 | 15 | 0.05 | 98.18 |
| NaF | 0.9 | 0 | 13 | 0.09 | 94.89 |
| NaF | 1.0 | 5 | 28 | 0.04 | 97.70 |
| $Na_2SiF_6$ | 0.9 | 0 | 0 | 0.11 | 95.13 |
| $Na_2SiF_6$ | 1.0 | 0 | 15 | 0.05 | 98.30 |
| $K_2SiF_6$ | 0.9 | 0 | 0 | 0.12 | 93.35 |
| $K_2SiF_6$ | 1.0 | 0 | 15 | 0.06 | 96.98 |

From the foregoing results, it will readily be understood that in case the fluorine compound salt is used as the disintegration-preventing agent in such an amount that the fluorine compound is caught on the reaction product is an amount, as calculated as F, of 0.05–0.20 equivalent to the calcium component in the reaction product, as the amount of sulfuric acid approximates 1.0 equivalent, the amount of the fluorine component caught on the reaction product is lowered and the resulting small masses tend to disintegrate readily.

EXAMPLE 18

This Example illustrates an embodiment in which phosphate rock is treated in advance so that the fluorine component contained in the phosphate rock can be utilized as the disintegration-preventing agent and the so pre-treated phosphate rock is reacted with sulfuric acid.

The same pulverized phosphate rock produced in Florida as used in Example 1 is chosen and used as the starting phosphate rock.

A. A process in which the phosphate rock is pulverized by the wet method and the fluorine component in the phosphate rock is utilized is illustrated.

To 1 Kg of the phosphate rock is added about 650 ml of water. Namely, 40 parts by weight of water is added to 60 parts by weight of the phosphate rock. The mixture is ground by the wet method for 5 hours in a pot mill according to known procedures. Generation of a gas composed mainly of fluorine compounds is observed in the resulting slurry formed by the wet method. When This slurry is filtered and the filtrate is analyzed, the elution of F and $P_2O_5$ is confirmed. To the slurry is added 98 % sulfuric acid ($H_2SO_4$) in an amount of 0.9 equivalent to the calcium component (CaO) in the phosphate rock. Namely, about 740 g of 98 % $H_2SO_4$ is added to the slurry and they are blended. The reaction of the mixture, drying and molding, and heat treatment are conducted in the same manner as in Example 2 to obtain heat-treated, solid non-disintegrable small masses.

B. A process in which the phosphate rock is partially decomposed with an acid in advance and the fluorine component contained in the phosphate rock is utilized as the disintegrating-preventing agent is illustrated.

To 1 Kg of the phosphate rock is added about 650 ml of water. Namely, 40 parts by weight of water is added to 60 parts of the phosphate rock. To the resulting slurry is added 98 % sulfuric acid ($H_2SO_4$) or 80 % pure phosphoric acid ($H_3PO_4$) in an amount of 0.15 or 0.40 equivalent to the calcium component (CaO) contained in the phosphate rock. Namely, about 125 or 330 g of 98 % sulfuric acid or about 100 or 265 g of 80 % pure phosphoric acid is added to the phosphate rock slurry. Generation of violent heat is caused to occur for a while and simultaneously, formation of a gas composed mainly of fluorine compounds is observed.

The resulting mixture is maintained at 75°–90°C. and agitated for 30 minutes, to thereby cause the partial reaction of the phosphate rock. To the resulting partially reacted phosphate rock slurry is added 98 % sulfuric acid ($H_2SO_4$) or 80 % pure phosphoric acid ($H_3PO_4$) in an amount of 0.75 or 0.5 equivalent to the calcium component (CaO) contained in the phosphate rock (0.9 equivalent as the total acid). More specifically, about 615 or 410 g of 98 % sulfuric acid or about 493 or 328 g of 80 % pure phosphoric acid is added to the partially reacted phosphate rock slurry. The resulting mixture is reacted, dried, molded and heat-treated in the same manner as in Example 2, to thereby obtain heat-treated small masses of the reaction product.

The static disintegration ratio and dynamic disintegration ratio of the heat-treated small masses are determined to obtain results shown in Table 23.

According to the extraction process described in Example 2, the phosphoric acid component is extracted and recovered from the heat-treated small masses to determine the recovery ratio. Results are shown in Table 23. Further, the heat-treated small masses are washed sufficiently with water, and CaO and $P_2O_5$ contents in the residue composed mainly of gypsum are determined, from which the decomposition ratio based on $P_2O_5$ contained in the starting phosphate rock is calculated. Results are shown in Table 23.

Table 23

|  | A) Wet granulation | B-1) Case where 0.15 equivalent of acid is used for partial reaction of phosphate rock | B-2) Case where 0.4 equivalent is used for partial reaction of phosphate rock |
|---|---|---|---|
| Static disintegration ratio (Ds) | 0 | 0 | 0 |
| Dynamic disintegration ratio (Dd) | 18 | 11 | 11 |
| Phosphoric acid recovery ratio (%) | 96.3 | 95.8 | 97.7 |
| Composition of main components in heat-treated small masses | | | |
| CaO (wt %) | 26.30 | 25.55 | 24.75 |
| $P_2O_5$ (wt %) | 18.03 | 17.63 | 17.00 |
| $SO_3$ (wt %) | 31.99 | 31.52 | 30.58 |
| F (wt %) | 5.80 | 6.22 | 5.45 |
| Composition of main components in washing residue of small masses | | | |
| CaO (wt %) | 34.88 | 35.04 | 33.30 |
| $P_2O_5$ (wt %) | 0.40 | 0.50 | 0.47 |
| Decomposition ratio (%) | 98.35 | 97.95 | 97.96 |

From the foregoing results, it will readily be understood that when the starting phosphate rock is pretreated and thus, the fluorine component contained in the phosphate rock is utilized as the disintegration-preventing agent, the small masses of the phosphate rock-sulfuric acid reaction product obtained from such pretreated phosphate rock by reacting it with sulfuric acid and conducting the heat-treatment do not disintegrate throughout the extraction step and phosphoric acid can be prepared from the small masses in a high yield.

In case phosphate rock containing the fluorine component in the apatite structure is reacted with sulfuric acid, the fluorine component included in the apatite structure is not effective at all as the disintegration-preventing agent. If, as in this Example, the apatite structure is once destroyed and the fluorine component is released from the apatite structure, the so released fluorine component can be utilized as the disintegration-preventing agent.

EXAMPLE 19

This Example illustrates, by reference to the flow sheet (FIG. 2), an embodiment of a pilot-plan scale in which a fluorine compound is used as the disintegration-preventing agent, small masses of the phosphate rock-sulfuric acid reaction product are prepared under the conditions of this invention and the phosphoric acid is recovered from said small masses, and in which about 5 tons per day of phosphate rock are treated.

Figure 2:
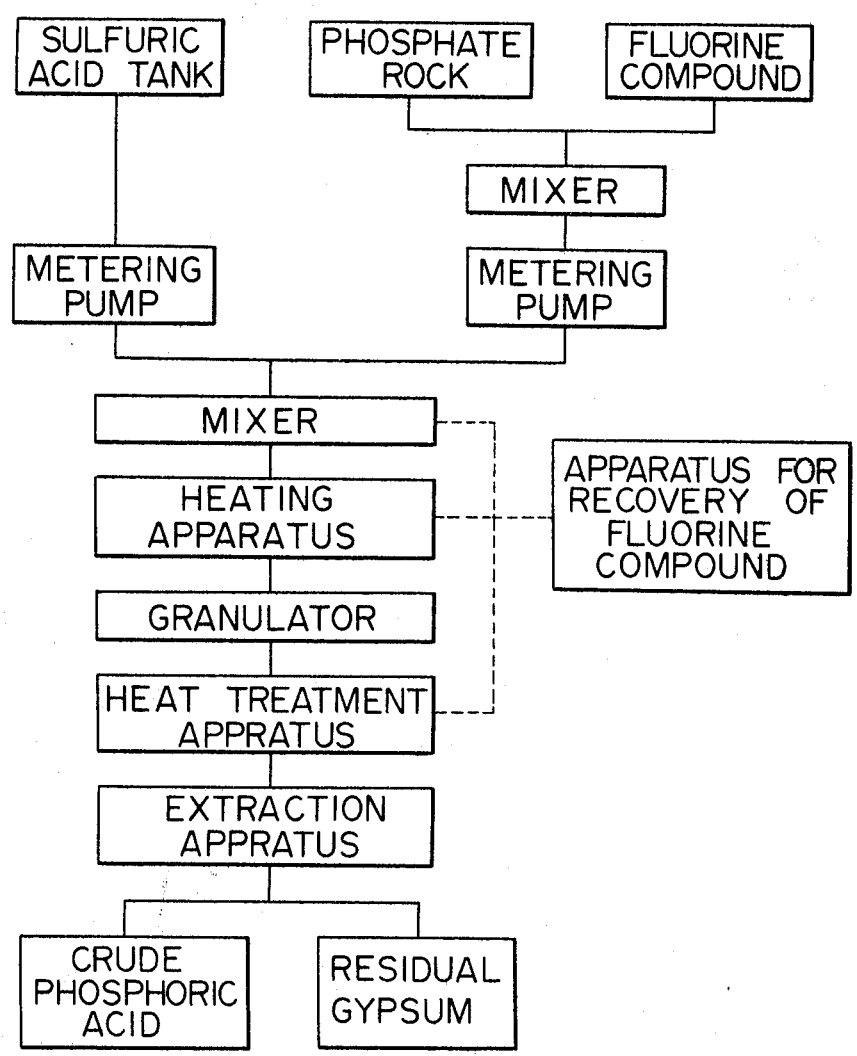
FIG. 2 shows a typical flow-chart according to this invention.

In the flow sheet of FIG. 2, about 200 Kg/hr of phosphate rock produced in Florida, which has been pulverized to a size passable through a 200-mesh sieve, and about 160 l/hr of a mixed acid solution of hydrofluoric acid and hexafluorosilicic acid (having a concentration of 119 g per liter calculated as fluorine) are mixed in a mixer (mixing tank). The resulting slurry is fed to a mixer (a tank for mixing sulfuric acid and phosphate rock slurry) by means of a metering pump. At the same time, 150 Kg/hr of 98% sulfuric acid is fed to the mixer by means of a metering pump. This mixer comprises, for instance, a vertical agitation shaft provided with a plurality of agitation vanes extending in the horizontal direction, and a discharge outlet disposed at the lower end. In this mixer, the phosphate rock slurry and sulfuric acid are mixed intimately for 1 to 5 minutes, and the mixture is discharged toward an introduction opening of a heating apparatus. This heating apparatus comprises, for instance, two rotary screw shafts, and the introduction opening is provided in the upper portion of one end of the heating apparatus and a discharge opening is disposed in the lower portion of the other end. Pitches of the screws are preferably higher on the introduction side than in other parts. The mixture of the phosphate rock slurry and sulfuric acid discharged from the mixer is introduced in this heating apparatus, where the mixture is uniformly heated and blended. For accomplishing such heating and blending, a heating jacket provided with an inlet for superheated steam and an outlet for condensed water is mounted outside the heating apparatus, and hot air fed from a combustion furnace through a conduit is projected into the heating apparatus from an injection opening provided on the outer wall of the heating apparatus and an injection opening provided on the screw. In this heating apparatus, the phosphate rock and sulfuric acid are heated and blended at 65°– 79°C. for 20–30 minutes. A granulator is disposed on the discharge side of the heating apparatus, and by this granulator, the mixture of the phosphate rock and sulfuric acid is molded into a ribbon having a thickness of 0.4–1.0 cm and a length of 0.5–2.0 cm. A heat treatment apparatus is disposed below the heating apparatus. For instance, this heat treatment apparatus comprises a drier of the net-conveyor type provided with an endless net-conveyor extending in the horizontal direction and a rotary heat treatment device positioned below the drier.

Ribbons of the phosphate rock-sulfuric acid mixture are heated at 150°–180°C. for about 30 minutes in this drier of the net-conveyor type and then heated at 150°–1/2°C. for 0.5–1.0 hour in the rotary heat treatment device.

An extraction apparatus is disposed below the heat treatment apparatus to extract the phosphoric acid component from the phosphate rock-sulfuric acid reaction product. For instance, as this extraction apparatus is employed a rotary drum extraction apparatus of the countercurrent type installed with a spiral partition passage. This extraction apparatus is inclined upwardly from the phosphate rock-sulfuric acid reaction product-feeding side of the drum, to the direction of the advance of the reaction product, and a warm water inlet is disposed on the other side of the drum. The small masses of the phosphate rock-sulfuric acid reaction product discharged from the heat treatment apparatus is fed into the extraction apparatus from the lower side of the extraction apparatus, and about 200 Kg/hr of warm water maintained at about 90°C. is fed into the extraction apparatus from the warm water inlet. The extraction is carried out at 75°–95°C. for 1–1.5 hours in this extraction apparatus.

Thus, about 140 l/hr of crude phosphoric acid having a concentration of about 42 % as calculated as $P_2O_5$ is recovered in a reservoir for crude phosphoric acid. The residue left after extraction of phosphoric acid is discharged into a residue recovery apparatus. No substantial disintegration is observed in the residual small masses.

Pipes are attached to the mixer, heating apparatus and heat treatment apparatus to catch a fluorine compound gas formed in these apparatuses by the reaction between the phosphate rock and sulfuric acid and introduce it into a fluorine compound recovery apparatus, which comprises a shaft extending in the horizontal direction and a plurarity of discs mounted on the shaft at certain intervals. Water is charged into this recovery apparatus while leaving a space in the upper portion of the apparatus. By rotating the discs, the fluorine compound gas introduced through the above tubes is contacted uniformly and intimately with sprinkles of water. Thus, the fluorine compound gas formed by the reaction between the phosphate rock and sulfuric acid is recovered at a recovery ratio exceeding 90%, and a part of the so recovered fluorine compound is recycled in the above-mentioned mixer for mixing the phosphate compound to the starting phosphate rock.

What we claim is:

1. In a process for the preparation of phosphoric acid which comprises mixing phosphate rock and sulfuric acid in the presence of water, drying the mixture to obtain a solid reaction product between phosphate rock and sulfuric acid and extracting phosphoric acid from said solid reaction product, the improvement which comprises mixing phosphate rock and sulfuric acid in an amount of 0.7 to 0.97 equivalent to the calcium component in the phosphate rock, in the presence of water at a temperature of 30° to 105°C., under such condition that gypsum dihydrate is stably formed and that the following requirement is satisfied:

$0.70 \geq C \geq 0.45$ wherein C designates the weight ratio of phosphate rock to the sum of phosphate rock and total water, the mixing of phosphate rock and sulfuric acid being carried out for a time sufficient to substantially complete the decomposition of the phosphate rock by sulfuric acid, and drying the mixing reaction product between the phosphate rock and sulfuric acid to solid small masses of the phosphate rock-sulfuric acid reaction product at a temperature not exceeding 200°C. under such drying time and heating conditions that the gypsum dihydrate in said mixing reaction product is converted substantially to anhydrous gypsum or a combination of anhydrous gypsum and gypsum hemihydrate.

2. The process of claim 1, wherein the mixing of phosphate rock and sulfuric acid is carried out in two stages by employing sulfuric acid in an amount of 0.1 to 0.5 equivalent to the calcium component in phosphate rock at the first stage, whereby the fluorine component contained in the phosphate rock is converted to hydrofluoric acid or hexafluorosilicic acid.

3. The process of claim 1 wherein the mixing of the phosphate rock and sulfuric acid is conducted in the presence of 43 to 122 parts by weight of water per 100 parts of the dry weight of the phosphate rock.

4. The process of claim 1 wherein the mixing reaction product between the phosphate rock and sulfuric acid is dried at a temperature of 100° to 200°C. for 15 to 180 minutes.

5. The process of claim 1 wherein the phosphate rock-sulfuric acid reaction product is dried and ground into small masses having a size of 0.1 to 50 mm to thereby mold the phosphate rock-sulfuric acid reaction product into a solid granular reaction product.

6. The process of claim 1 wherein the phosphate rock-sulfuric acid reaction product is molded into granules and then dried to thereby convert the phosphate rock-sulfuric acid reaction product into a solid granular reaction product having a size of 0.1 to 50 mm.

7. The process of claim 1 wherein the phosphate rock-sulfuric acid reaction product is converted into a solid granular reaction product having a size of 0.1 to 50 mm while drying said phosphate rock-sulfuric acid reaction product.

8. The process of claim 1 wherein the phosphoric acid component is extracted at a temperature of 5° to 100°C. from the solid reaction product between the phosphate rock and sulfuric acid with use of a phosphoric acid extraction medium.

9. The process of claim 1 wherein the phosphoric acid composed is extracted with use of an aqueous extraction medium.

10. The process of claim 1 wherein the phosphoric acid component is extracted with use of an alcohol having less than 6 carbon atoms as an extraction medium.

11. The process of claim 1 wherein a disintegration-preventing agent is incorporated in preparing a mixture of phosphate rock and sulfuric acid.

12. The process of claim 11 wherein the disintegration-preventing agent is a fluorine compound selected from the group consisting of hydrofluoric acid, hexafluorosilicic acid and salts thereof.

13. The process of claim 11 wherein the disintegration-preventing agent is an alkali metal salt.

14. The process of claim 11 wherein the disintegration-preventing agent is amorphous silica.

15. The process of claim 12 wherein the fluorine compound is used in such an amount that it is contained in the solid reaction product in an amount, as calculated as fluorine (F), of 3 to 10 percent by weight.

16. The process of claim 12 wherein the fluorine compound is selected from the group consisting of alkali metal and alkaline earth metal salts of hydrofluoric acid and hexafluorosilicic acid, and it is used in an amount, as calculated as fluorine (F), of 3 to 10 percent by weight.

17. The process of claim 12 wherein the fluorine compound is selected from the group consisting of hydrofluoric acid and hexafluorosilicic acid, and said fluorine compound and sulfuric acid are used in such amounts as will satisfy the following conditions:

$(F) = 0.03 - 0.3$,
$(H_2SO_4) = 0.7 - 0.97$ and
$(F) + (H_2SO_4) = 0.73 - 1$, wherein $(F)$ is the number of equivalents, to calcium in the phosphate rock, of hydrofluoric acid or hexafluorosilicic acid contained in the reaction product in the form of a salt, and $(H_2SO_4)$ is the number of equivalents of sulfuric acid to calcium in the phosphate rock.

18. The process of claim 12 wherein pulverized phosphate rock and the fluorine compound are mixed in advance in the presence of water, and sulfuric acid is added to the mixture.

19. In a process for the preparation of phosphoric acid which comprises mixing phosphate rock and sulfuric acid in the presence of water, drying the mixture to obtain a solid reaction product between phosphate rock and sulfuric acid and extracting phosphoric acid from said solid reaction product, the improvement which comprises mixing phosphate rock and sulfuric acid in an amount of 0.7 to 0.97 equivalent to the calcium component in the phosphate rock in the presence of water at a temperature ($t°C.$) of 30° to 105°C. under such conditions that the $P_2O_5$ concentration (P) of phosphoric acid in the phosphate rock slurry is within a range of from 20 to 45 percent, the weight ratio (C) of phosphate rock to the sum of phosphate rock and total water is within a range of from 0.45 to 0.70 and that the following requirement is satisfied:

$$t \leq -0.111 P + 0.00334 P^2 - 0.000593 P^3 + 107.2,$$

the mixing of phosphate rock and sulfuric acid being carried out for a time sufficient to substantially complete the decomposition of the phosphate rock by sulfuric acid, and drying said mixing reaction product to small solid masses of the phosphate rock-sulfuric acid reaction product at a temperature not exceeding 200°C. under such drying time and heating conditions that the gypsum dihydrate in said mixing reaction product is converted substantially to anhydrous gypsum or a combination of gypsums anhydrite and hemihydrate.

* * * * *